(12) United States Patent
Yamada et al.

(10) Patent No.: US 12,438,993 B2
(45) Date of Patent: Oct. 7, 2025

(54) ULTRASONIC DEVICE

(71) Applicant: SEIKO EPSON CORPORATION, Tokyo (JP)

(72) Inventors: Masayoshi Yamada, Shiojiri (JP);
Hikaru Iwai, Matsukawa-machi (JP);
Shigeaki Muramatsu, Nagano (JP);
Toshiya Okada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 335 days.

(21) Appl. No.: 18/146,474

(22) Filed: Dec. 27, 2022

(65) Prior Publication Data
US 2023/0208990 A1 Jun. 29, 2023

(30) Foreign Application Priority Data

Dec. 27, 2021 (JP) .................................. 2021-212433

(51) Int. Cl.
*H04N 1/00* (2006.01)
*B06B 1/06* (2006.01)

(52) U.S. Cl.
CPC ..... *H04N 1/00732* (2013.01); *H04N 1/00551* (2013.01); *H04N 1/00689* (2013.01); *H04N 1/00909* (2013.01); *B06B 1/0662* (2013.01)

(58) Field of Classification Search
CPC .................. H04N 1/00732; H04N 1/00909
See application file for complete search history.

(56) References Cited

U.S. PATENT DOCUMENTS

| 2016/0255225 A1 | 9/2016 | Yamamoto et al. |
| 2020/0039774 A1 | 2/2020 | Yamada et al. |
| 2020/0307935 A1* | 10/2020 | Nonoyama ............... B65H 7/14 |

FOREIGN PATENT DOCUMENTS

| JP | H06087550 A | 3/1994 |
| JP | 2016159986 A | 9/2016 |
| JP | 2020025242 A | 2/2020 |

OTHER PUBLICATIONS

Office Action for JP Patent Application No. 2021212433, issued on Jul. 15, 2025, 12 pages.

* cited by examiner

*Primary Examiner* — Walter L Lindsay, Jr.
*Assistant Examiner* — Andrew V Do
(74) *Attorney, Agent, or Firm* — CHIP LAW GROUP

(57) ABSTRACT

An ultrasonic device includes an ultrasonic element configured to perform at least one of transmission of an ultrasonic wave along a first axis and reception of the ultrasonic wave input along the first axis, and a protective member provided on the first axis to cover the ultrasonic element. The protective member has a first surface provided with at least one hole through which the ultrasonic wave travelling along the first axis passes, and a second surface intersecting with the first surface and provided with a first opening through which foreign matter entering from the at least one hole is discharged.

13 Claims, 20 Drawing Sheets

FIG. 14
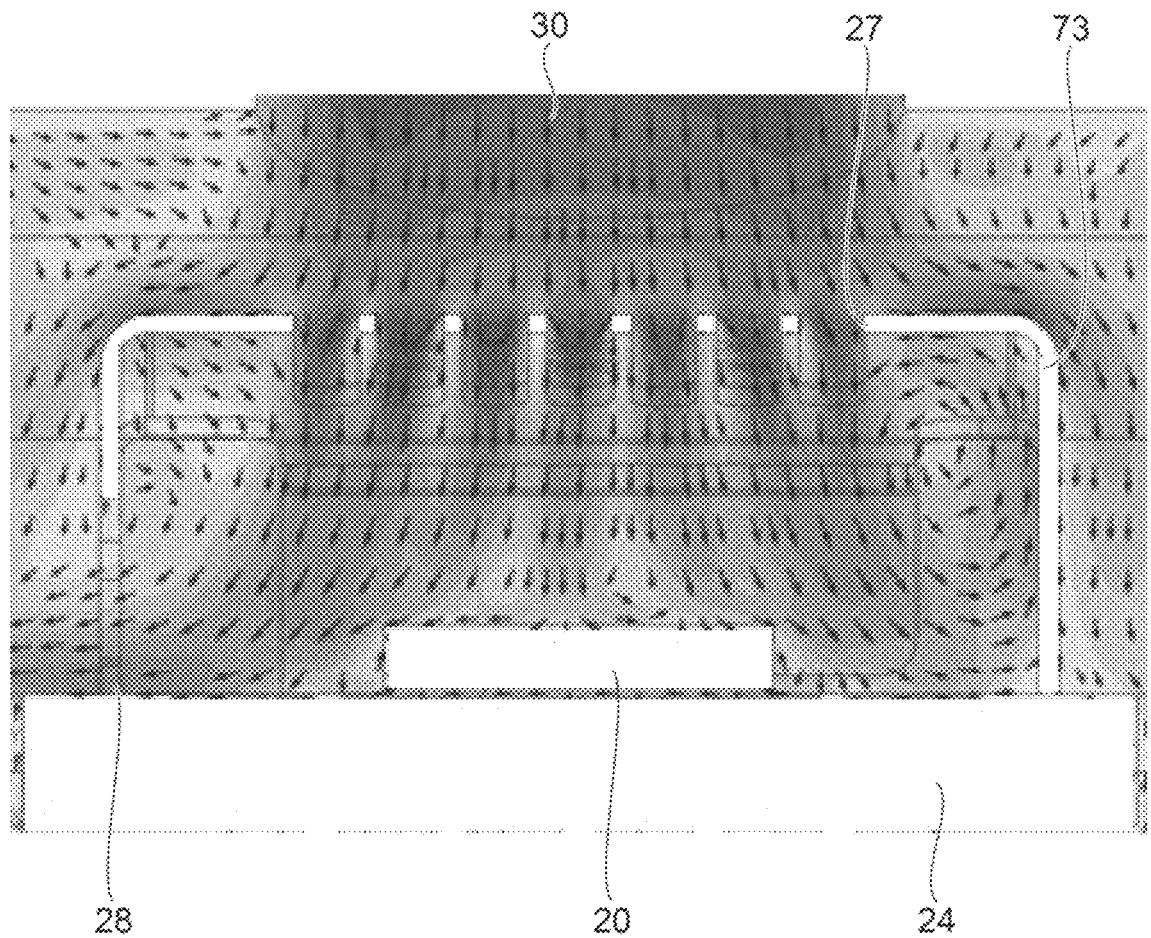
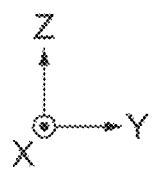

ULTRASONIC DEVICE

The present application is based on, and claims priority from JP Application Serial Number 2021-212433, filed Dec. 27, 2021, the disclosure of which is hereby incorporated by reference herein in its entirety.

BACKGROUND

1. Technical Field

The present disclosure relates to an ultrasonic device.

2. Related Art

A printer and a scanner including a paper supply device are widely used. These devices each include a multi-feed detecting device that detects that a plurality of sheets are simultaneously fed. For example, JP-A-2020-25242 discloses a multi-feed detecting device including an ultrasonic device. According to JP-A-2020-25242, the ultrasonic device includes ultrasonic elements. Since the ultrasonic elements are likely to be broken, the ultrasonic elements are housed in a housing that protects the ultrasonic elements. In the housing, a wire mesh is installed at a portion through which an ultrasonic wave passes.

However, in the wire mesh for protection of JP-A-2020-25242, fine foreign matter such as paper dust generated from paper and dust passes through the wire mesh and enters an inside of the housing. The intruded foreign matter may adhere to and accumulate on the ultrasonic elements. In addition, a configuration of JP-A-2020-25242 does not include a mechanism for discharging the foreign matter adhering to the ultrasonic elements. That is, in the related art, there is a possibility that sensitivity of the ultrasonic elements is lowered due to the fine foreign matter.

SUMMARY

An ultrasonic device includes an ultrasonic element configured to perform at least one of transmission of an ultrasonic wave along a first axis and reception of the ultrasonic wave input along the first axis, and a protective member provided on the first axis to cover the ultrasonic element. The protective member has a first surface provided with at least one hole through which the ultrasonic wave travelling along the first axis passes, and a second surface intersecting with the first surface and provided with a first opening through which foreign matter entering from the at least one hole is discharged.

BRIEF DESCRIPTION OF THE DRAWINGS

FIG. 14 is a diagram showing a simulation result.

DESCRIPTION OF EXEMPLARY EMBODIMENTS

First Embodiment

In the present embodiment, a characteristic example of an image scanner and an ultrasonic device mounted on the image scanner will be described.

Figure 1:
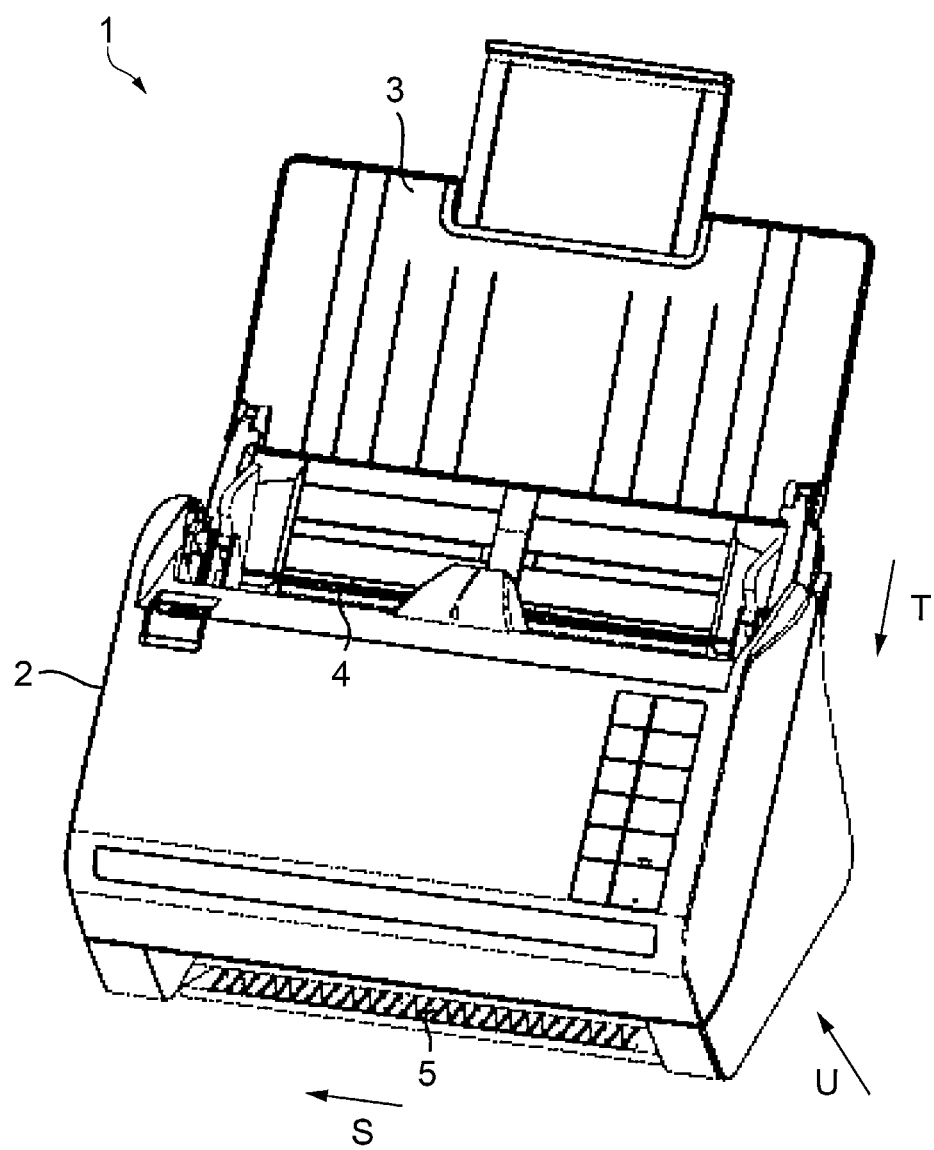
FIG. 1 is a schematic perspective view showing a configuration of an image scanner according to a first embodiment.

An image scanner 1 shown in FIG. 1 is an example of an electronic device. The image scanner 1 includes a device main body 2 and a sheet support 3. On the device main body 2, a feeding port 4 is provided at a connection position with the sheet support 3. Sheets are fed from the feeding port 4. A direction in which the sheets are supplied is a conveying direction, a downstream direction, and a positive T direction. A negative T direction is an upstream direction. Of directions orthogonal to the positive T direction on the sheets at the feeding port 4, a direction directed toward a left side in the drawing is a positive S direction. In the device main body 2, an exit 5 is disposed on a positive T direction side of the feeding port 4. A sheet from which an image is read is discharged from the exit 5. Of directions orthogonal to the positive S direction and the positive T direction, a direction directed toward upper left in the drawing is a positive U direction. The positive U direction is a thickness direction of the sheet in the sheet support 3.

Figure 2:
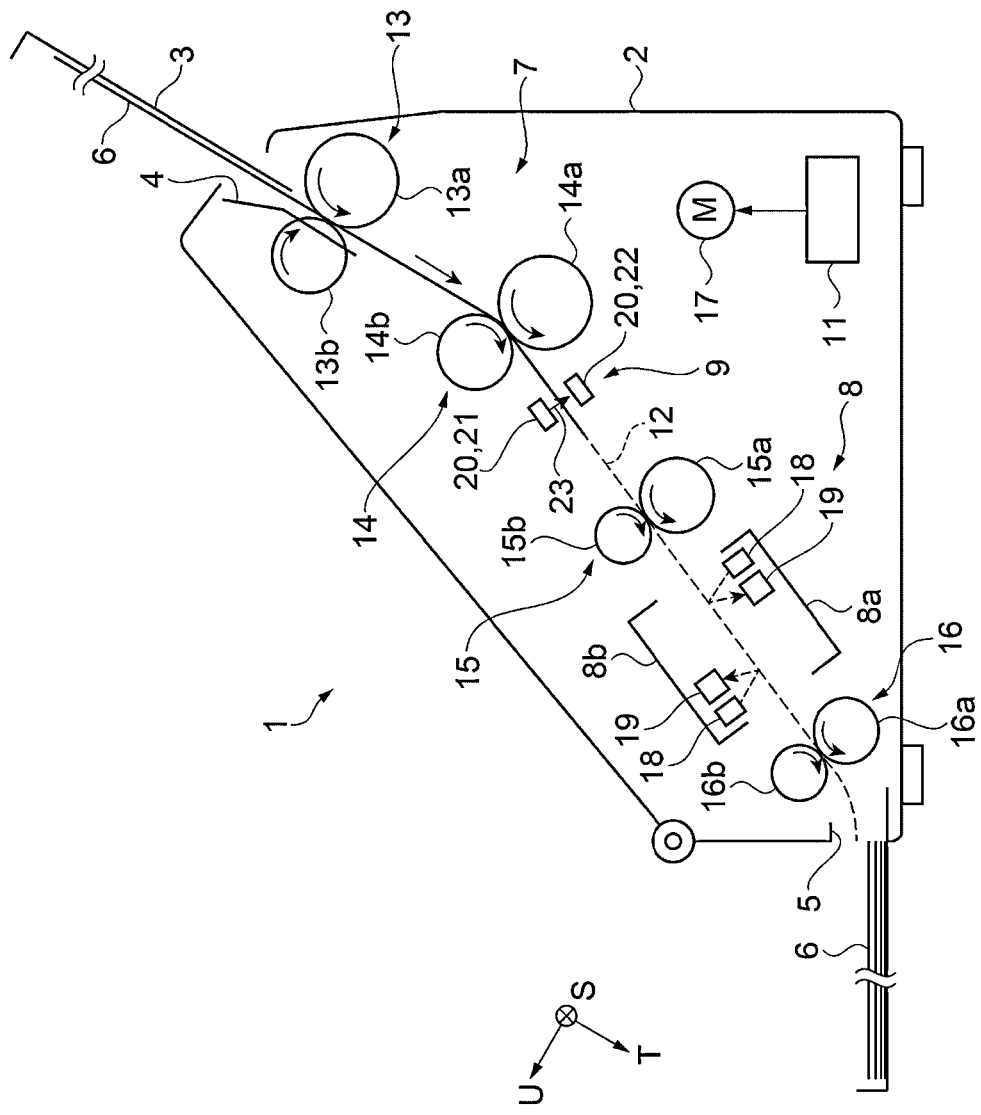
FIG. 2 is a schematic side sectional view showing a configuration of a conveyance unit of the image scanner.

As shown in FIG. 2, a conveyance unit 7 that conveys a sheet 6 as an object, a scanning unit 8 that reads an image of the conveyed sheet 6, an ultrasonic device 9 that detects multi-feed of the sheet 6, a control unit 11 that controls the image scanner 1, and the like are provided inside the device main body 2. In the present embodiment, an example is shown in which the ultrasonic device 9 detects the multi-feed of the sheet 6 with the sheet 6 as the object, and the present disclosure is not limited thereto. Examples of the object include various media such as films and fabrics.

The sheet 6 placed on the sheet support 3 is fed one by one to the feeding port 4. The fed sheet 6 is conveyed by the conveyance unit 7 along a predetermined conveying path 12 in the device main body 2. Then, at a reading position in the middle of the conveyance, the image is read by the scanning unit 8, and then the sheet 6 is discharged from the exit 5 which is opened toward a lower front portion of the device main body 2. A feeding port 4 side of the conveying path 12 is an upstream side. An exit 5 side of the conveying path 12 is a downstream side.

The conveyance unit 7 conveys a plurality of sheets 6 set on the sheet support 3 one by one in the conveying direction. The conveyance unit 7 feeds the sheet 6 fed from the feeding port 4 into the device main body 2. The conveyance unit 7 conveys the fed sheet 6 along the predetermined conveying path 12.

The conveyance unit 7 includes a first feed roller pair 13 disposed upstream of the conveying path 12. The conveyance unit 7 includes a second feed roller pair 14 disposed downstream of the first feed roller pair 13. The conveyance unit 7 includes a first conveyance roller pair 15 disposed upstream of the scanning unit 8. The conveyance unit 7 further includes a second conveyance roller pair 16 disposed downstream of the scanning unit 8.

The first feed roller pair 13 includes a first drive roller 13a and a first driven roller 13b. The second feed roller pair 14 includes a second drive roller 14a and a second driven roller 14b. The first conveyance roller pair 15 includes a third drive roller 15a and a third driven roller 15b. The second conveyance roller pair 16 includes a fourth drive roller 16a and a fourth driven roller 16b.

The first drive roller 13a, the second drive roller 14a, the third drive roller 15a, and the fourth drive roller 16a are rotationally driven by power of a conveyance motor 17 that is a power source. The conveyance motor 17 is controlled by the control unit 11. The first driven roller 13b, the second driven roller 14b, the third driven roller 15b, and the fourth driven roller 16b are driven by the first drive roller 13a, the second drive roller 14a, the third drive roller 15a, and the fourth drive roller 16a, respectively.

The second driven roller 14b constituting the second feed roller pair 14 is a retard roller. A coefficient of friction of an outer circumferential surface of the second driven roller 14b with respect to the sheet 6 is larger than a coefficient of friction of an outer circumferential surface of the second drive roller 14a with respect to the sheet 6. Therefore, the second feed roller pair 14 functions as a separation mechanism that separates the sheets 6 one by one and feeds the sheets 6 to the positive T direction side. The plurality of sheets 6 stacked on the sheet support 3 are fed, by the rotation of the first feed roller pair 13, one by one from the feeding port 4 into the device main body 2 in order, for example, from an uppermost sheet. The sheets 6 are separated one by one by the rotation of the second feed roller pair 14. Next, the sheet 6 is fed downstream of the conveying path 12.

The ultrasonic device 9 is provided between the second feed roller pair 14 and the first conveyance roller pair 15. The ultrasonic device 9 is a multi-feed sensor that detects the multi-feed of the sheet 6 conveyed by the conveyance unit 7.

The ultrasonic device 9 is provided with a pair of ultrasonic elements 20. One of the pair of ultrasonic elements 20 is a transmission unit 21. The transmission unit 21 transmits ultrasonic waves. The other of the pair of ultrasonic elements 20 is a reception unit 22. The reception unit 22 receives the ultrasonic waves.

The transmission unit 21 and the reception unit 22 are disposed with the conveying path 12 along which the sheet 6 is conveyed interposed therebetween. The transmission unit 21 transmits an ultrasonic wave 23 toward the sheet 6 conveyed along the conveying path 12 by the conveyance unit 7. The ultrasonic wave 23 transmitted from the transmission unit 21 is transmitted through the sheet 6. The ultrasonic wave 23 transmitted through the sheet 6 is received by the reception unit 22. The reception unit 22 outputs a reception signal corresponding to a sound pressure of the received ultrasonic wave 23 to the control unit 11. Based on an intensity of the sound pressure indicated by the reception signal, the control unit 11 detects the multi-feed of the sheet 6.

The scanning unit 8 that reads the image on the sheet 6 is provided between the first conveyance roller pair 15 and the second conveyance roller pair 16 on the conveying path 12. The scanning unit 8 includes a first scanning unit 8a and a second scanning unit 8b provided on both sides of the conveying path 12.

The scanning unit 8 is implemented by light sources 18 that emit light to the sheet 6 being conveyed and image sensors 19 that extend in the positive S direction. The positive S direction in which the image sensor 19 extends is referred to as a main scanning direction. Each of the first scanning unit 8a and the second scanning unit 8b includes the light source 18 and the image sensor 19. A surface of the sheet 6 facing a negative U direction is a front surface. In a normal reading mode in which the front surface of the sheet 6 is read, the first scanning unit 8a performs a reading operation. In a double-surface reading mode in which the front surface and a back surface of the sheet 6 are read, both the first scanning unit 8a and the second scanning unit 8b perform the reading operation. The light sources 18 and the image sensors 19 are electrically coupled to the control unit 11. The control unit 11 controls scanning processing of reading the image on the sheet 6. The sheet 6 on which the scanning processing is completed is discharged from the exit 5.

Figure 3:
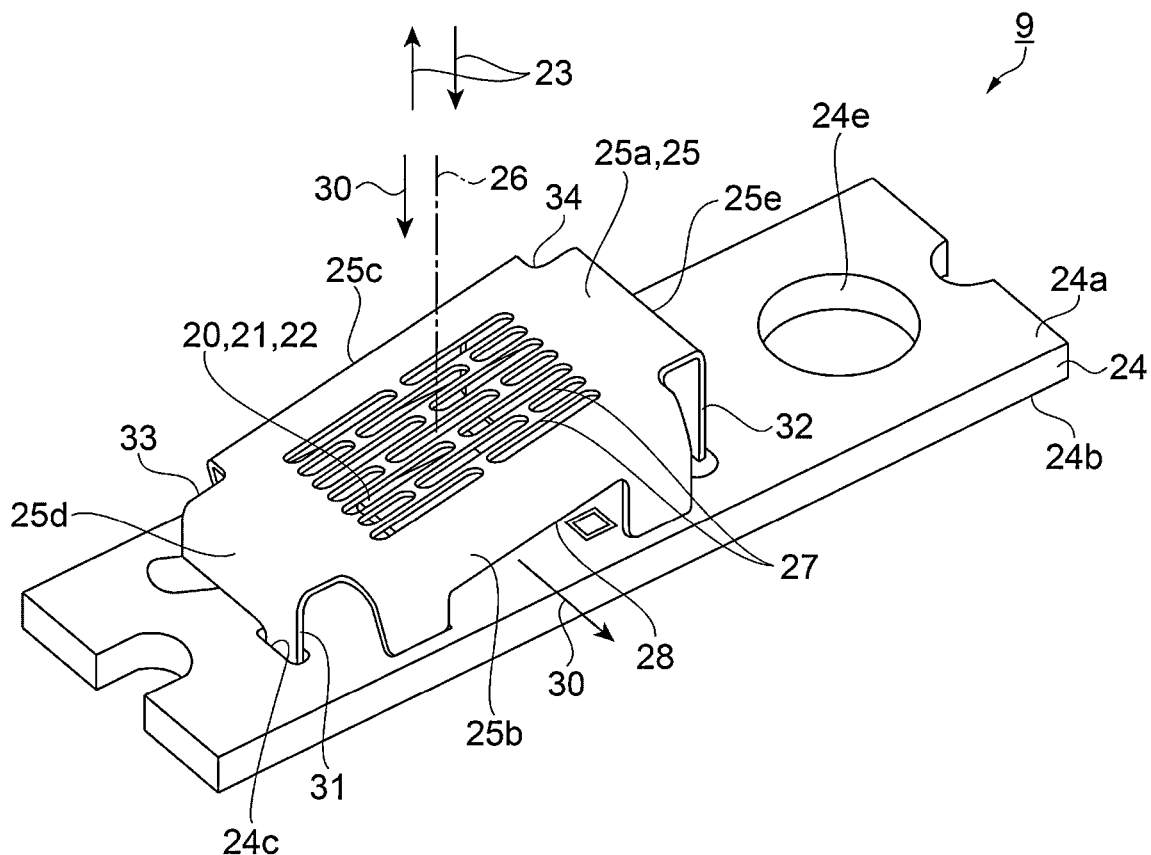
FIG. 3 is a schematic perspective view showing a configuration of an ultrasonic device.
Figure 4:
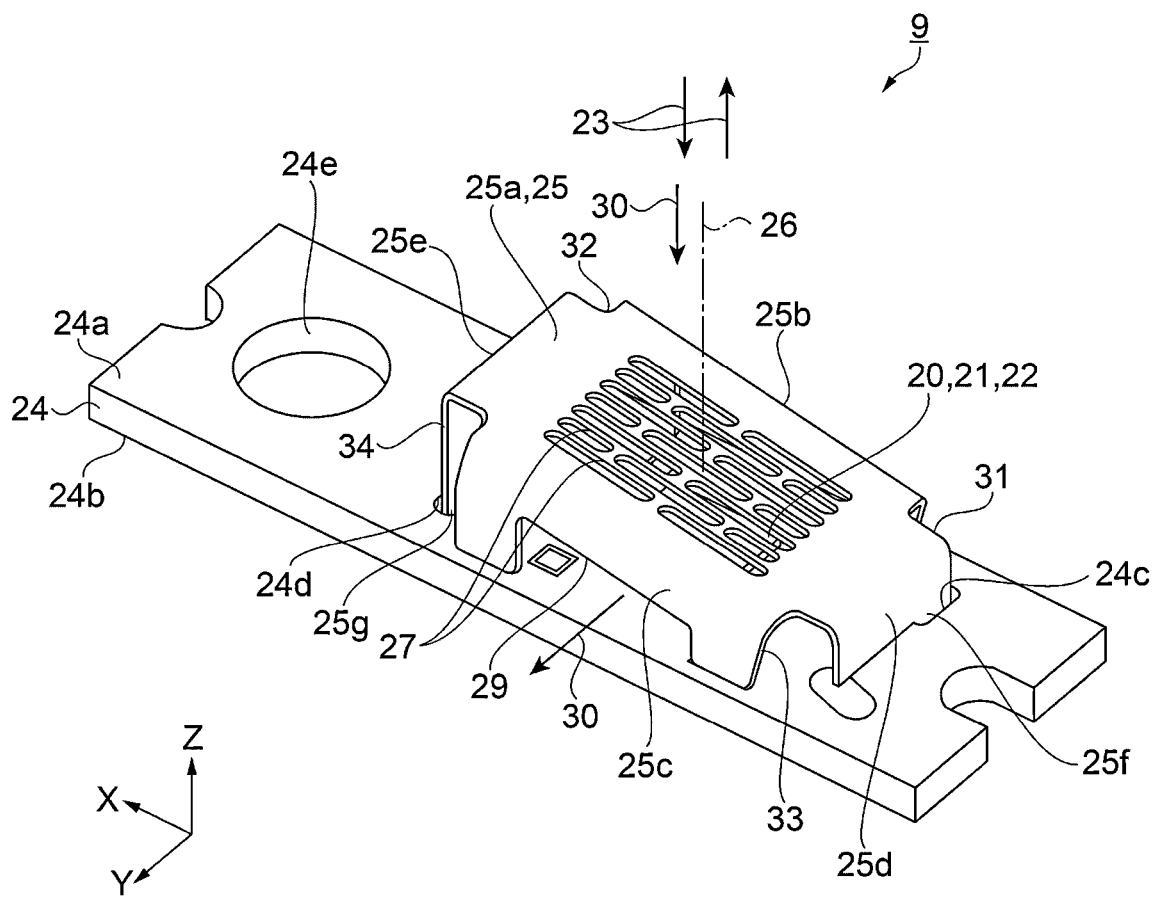
FIG. 4 is a schematic perspective view showing the configuration of the ultrasonic device.
Figure 5:
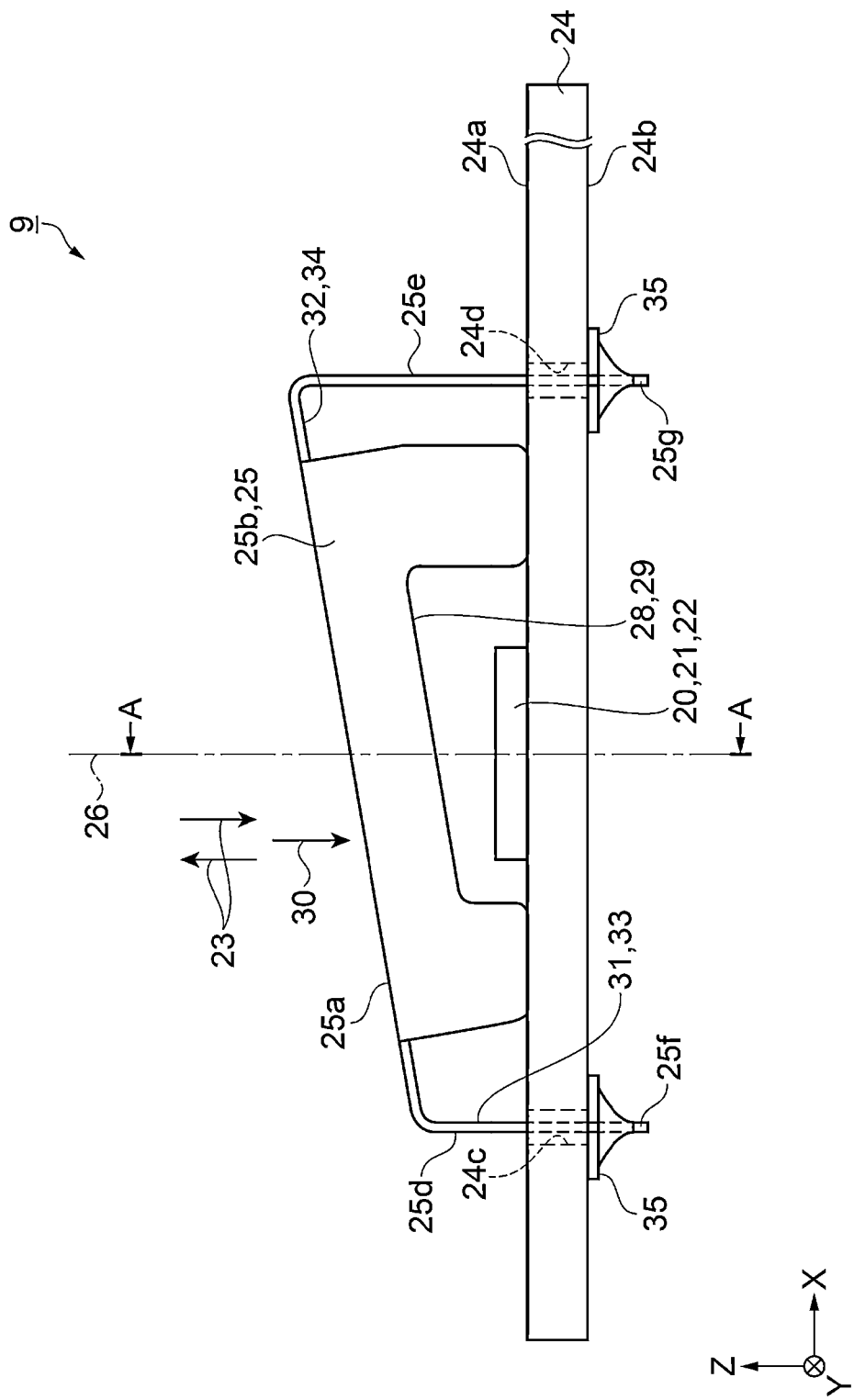
FIG. 5 is a schematic side view showing the configuration of the ultrasonic device.
Figure 6:
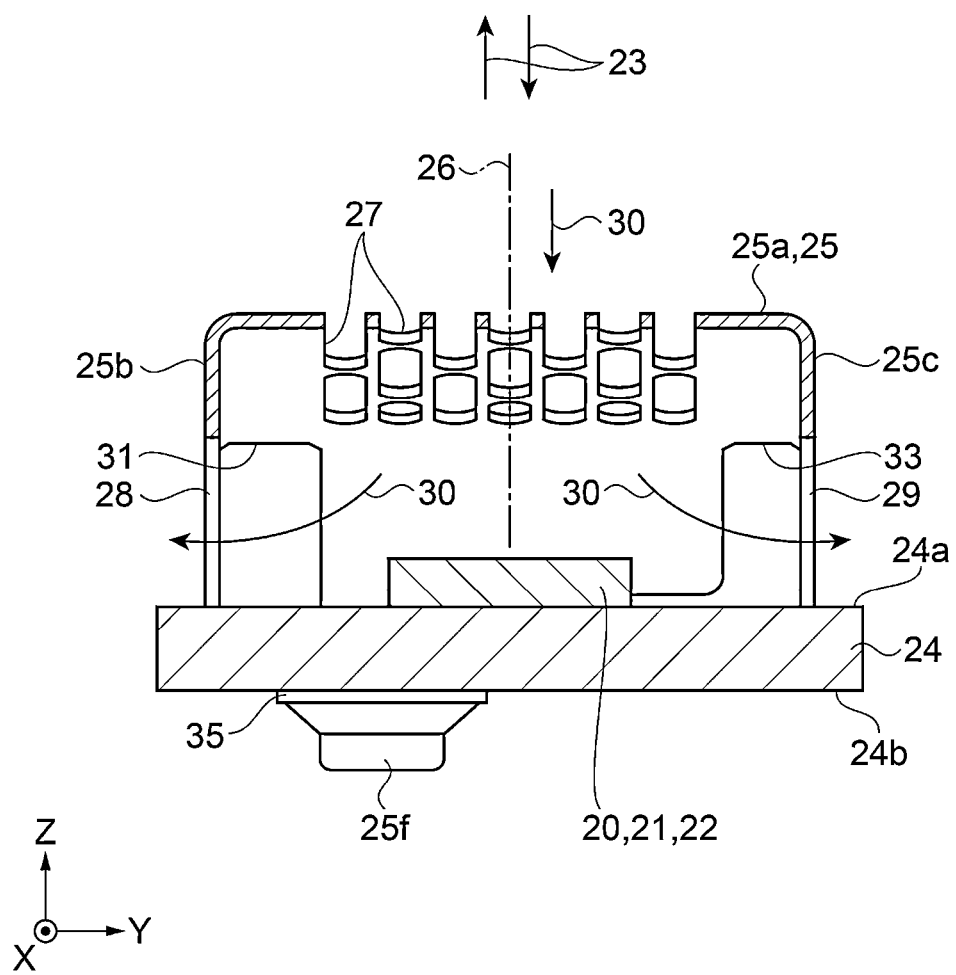
FIG. 6 is a schematic side sectional view showing the configuration of the ultrasonic device.

As shown in FIGS. 3 to 6, the ultrasonic device 9 includes a circuit board 24. The circuit board 24 has a rectangular plate shape. A longitudinal direction of the circuit board 24 is a positive X direction. A short direction of the circuit board 24 is a positive Y direction. A thickness direction of the circuit board 24 is a positive Z direction. The positive X direction, the positive Y direction, and the positive Z direction are orthogonal to one another. FIG. 3 is a view of the ultrasonic device 9 as viewed from a negative X direction, a negative Y direction, and the positive Z direction. FIG. 4 is a view of the ultrasonic device 9 as viewed from the negative X direction, the positive Y direction, and the positive Z direction. FIG. 5 is a view of the ultrasonic device 9 as viewed from the negative Y direction. FIG. 6 is a cross-sectional view taken along a line A-A of FIG. 5.

A surface of the circuit board 24 on a positive Z direction side is a board surface 24a. A surface of the circuit board 24 on a negative Z direction side is a board back surface 24b. The ultrasonic device 9 includes the ultrasonic element 20 and a protective member 25 on the board surface 24a. The ultrasonic element 20 is the transmission unit 21 or the reception unit 22. The transmission unit 21 transmits the ultrasonic wave 23 along a first axis 26. The reception unit 22 receives the ultrasonic wave 23 input along the first axis 26. The ultrasonic element 20 performs at least one of the transmission of the ultrasonic wave 23 along the first axis 26 and the reception of the ultrasonic wave 23 input along the first axis 26.

The protective member 25 is provided on the first axis 26. The protective member 25 covers the ultrasonic element 20. The protective member 25 has a first surface 25a, a second surface 25b, a third surface 25c, a fourth surface 25d, and a fifth surface 25e. The first surface 25a is disposed in the positive Z direction of the ultrasonic element 20. The first surface 25a is provided with a plurality of holes 27 through which the ultrasonic wave 23 travelling along the first axis 26 passes. The holes 27 are elongated holes, and a longitudinal direction of the holes 27 is parallel to the longitudinal direction of the circuit board 24. When the ultrasonic element 20 is the transmission unit 21, the ultrasonic wave 23 transmitted by the transmission unit 21 travels toward the reception unit 22 through the holes 27. When the ultrasonic element 20 is the reception unit 22, the ultrasonic wave 23 travelling from the transmission unit 21 travels toward the reception unit 22 through the holes 27. As long as the ultrasonic wave 23 passes through the holes 27, the number of the holes 27 may be one. At least one hole 27 is provided in the first surface 25a. When the number of the hole 27 is one, a size of the hole 27 is preferably equal to or larger than a size of the ultrasonic element 20. Reflection of the ultrasonic wave 23 at the hole 27 can be reduced.

The first surface 25a faces the positive Z direction and the negative X direction. The ultrasonic wave 23 reflected by the protective member 25 on a back side of the first surface 25a of the ultrasonic wave 23 transmitted by the transmission unit 21 faces the circuit board 24 instead of facing the transmission unit 21. Therefore, it is possible to reduce an influence of the ultrasonic wave 23 reflected by the protective member 25 on the transmission unit 21.

The second surface 25b faces the negative Y direction. The second surface 25b is disposed in the negative Y direction of the ultrasonic element 20. The second surface 25b intersects with the first surface 25a. The second surface 25b is provided with a first opening 28 through which foreign matter entering from the plurality of holes 27 is discharged.

According to this configuration, the ultrasonic element 20 can be protected by the protective member 25. Fine foreign matter may enter from the plurality of holes 27 provided in the protective member 25. The fine foreign matter is paper dust generated from the paper or dust. An air flow 30 is generated as the sheet 6 moves between the transmission unit 21 and the reception unit 22. The air flow 30 enters from the plurality of holes 27 and passes through the first opening 28, whereby the foreign matter can be discharged from the first opening 28 of the second surface 25b. As a result, sensitivity of the ultrasonic element 20 can be prevented from being lowered by the foreign matter.

The third surface 25c faces the positive Y direction.

The third surface 25c intersects with the first surface 25a. The third surface 25c faces the second surface 25b with the ultrasonic element 20 interposed therebetween. The third surface 25c is provided with a second opening 29 through which the foreign matter entering from the plurality of holes 27 is discharged.

According to this configuration, the air flow 30 enters from the plurality of holes 27 and passes through the second opening 29, whereby the foreign matter can be discharged from the second opening 29 of the third surface 25c in addition to the first opening 28 of the second surface 25b. As a result, the sensitivity of the ultrasonic element 20 can be prevented from being lowered by the foreign matter.

The fourth surface 25d faces the negative X direction. A third opening 31 is disposed between the second surface 25b and the fourth surface 25d. The fine foreign matter moves to an outside of the protective member 25 through the third opening 31. Therefore, the fine foreign matter is prevented from being accumulated between the second surface 25b and the fourth surface 25d.

The fifth surface 25e faces the positive X direction. A fourth opening 32 is disposed between the second surface 25b and the fifth surface 25e. The fine foreign matter moves to the outside of the protective member 25 through the fourth opening 32. Therefore, the fine foreign matter is prevented from being accumulated between the second surface 25b and the fifth surface 25e.

A fifth opening 33 is disposed between the third surface 25c and the fourth surface 25d. The fine foreign matter moves to the outside of the protective member 25 through the fifth opening 33. Therefore, the fine foreign matter is prevented from being accumulated between the third surface 25c and the fourth surface 25d.

A sixth opening 34 is disposed between the third surface 25c and the fifth surface 25e. The fine foreign matter moves to the outside of the protective member 25 through the sixth opening 34. Therefore, the fine foreign matter is prevented from being accumulated between the third surface 25c and the fifth surface 25e.

The protective member 25 includes a first protrusion 25f protruding in a negative Z direction on the fourth surface 25d. The circuit board 24 includes a first hole 24c at a position corresponding to the first protrusion 25f. The first protrusion 25f is inserted into the first hole 24c. The protective member 25 includes a second protrusion 25g protruding in the negative Z direction on the fifth surface 25e. The circuit board 24 includes a second hole 24d at a position facing the second protrusion 25g. The second protrusion 25g is inserted into the second hole 24d. The first protrusion 25f and the second protrusion 25g protrude from the board back surface 24b.

As shown in FIG. 5, the circuit board 24 includes a ground terminal 35 surrounding the first hole 24c on the board back surface 24b. The circuit board 24 includes the ground terminal 35 surrounding the second hole 24d on the board back surface 24b. The first protrusion 25f and the second protrusion 25g are fixed to the ground terminals 35 by soldering. The protective member 25 is made of a conductive material such as metal. The ground terminals 35 are electrically coupled to a metal component of the device main body 2. The protective member 25 protects the ultrasonic element 20 from static electricity and electromagnetic waves.

As shown in FIGS. 3 and 4, the circuit board 24 includes a third hole 24e in the positive X direction of the protective member 25. The third hole 24e is used when the ultrasonic device 9 is screwed.

Figure 7:
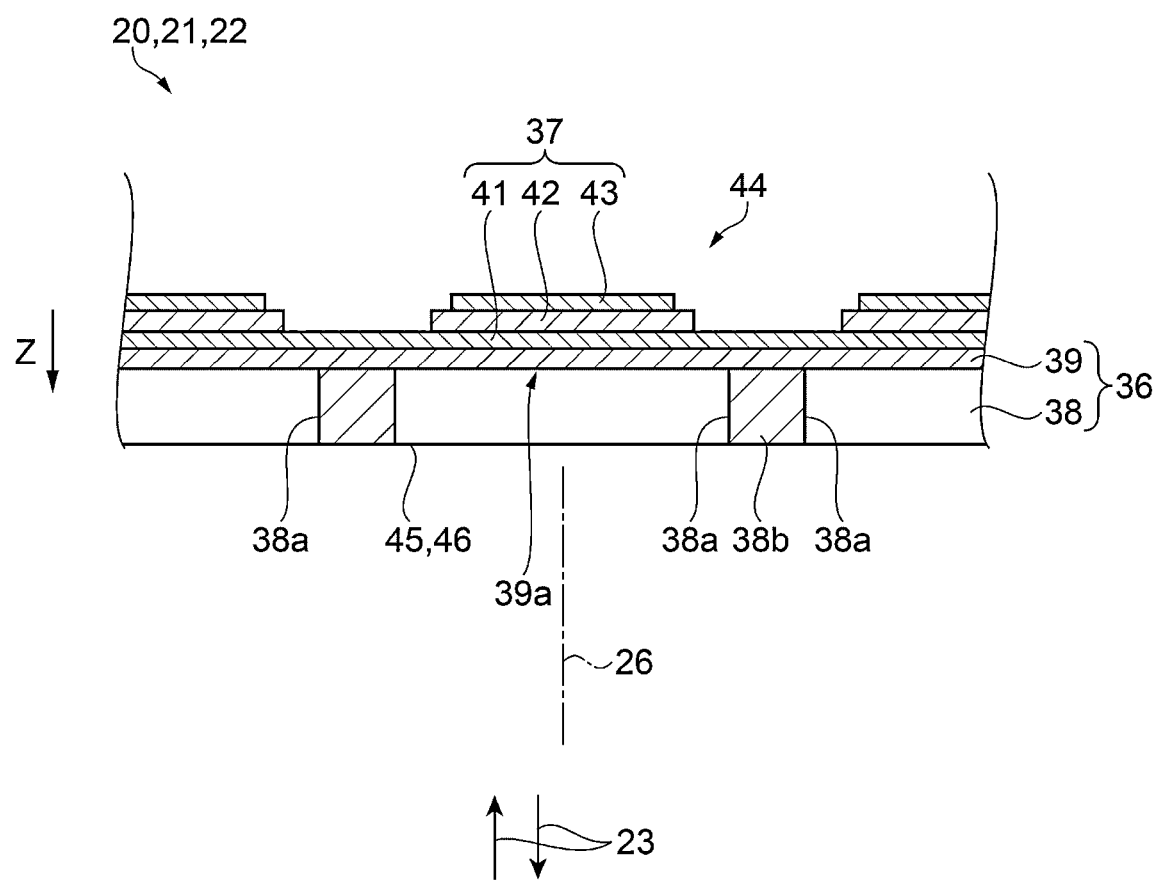
FIG. 7 is a schematic side sectional view of main parts showing a configuration of an ultrasonic element.

As shown in FIG. 7, when the ultrasonic element 20 is the transmission unit 21, the ultrasonic element 20 includes an element board 36 and a piezoelectric element 37. The element board 36 includes a board main body portion 38 and a vibration plate 39. The vibration plate 39 is provided on one surface side of the board main body portion 38. A board thickness direction of the element board 36 is the positive Z direction. The positive Z direction is a direction to which the ultrasonic wave 23 is transmitted. The positive Z direction is parallel to the first axis 26. The board main body portion 38 is a board that supports the vibration plate 39. The board main body portion 38 is formed of a semiconductor board made of Si or the like. The board main body portion 38 is provided with openings 38a penetrating the board main body portion 38 along a Z direction. When viewed from the positive Z direction, the openings 38a overlap the piezoelectric element 37.

The vibration plate 39 is formed of a laminate of $SiO_2$ and $ZrO_2$, or the like. The vibration plate 39 is provided on the negative Z direction side of the board main body portion 38.

The vibration plate 39 is supported by a partition wall 38b of the board main body portion 38 constituting the openings 38a. The vibration plate 39 closes the negative Z direction side of the openings 38a. Portions overlapping the openings 38a of the vibration plate 39 when viewed from the positive Z direction are vibration portions 39a.

The piezoelectric element 37 is provided on the vibration plate 39 on the negative Z direction side. The piezoelectric element 37 is provided at a position overlapping the vibration portions 39a when viewed from the positive Z direction. The piezoelectric element 37 includes a first electrode 41, a piezoelectric film 42, and a second electrode 43. The first electrode 41, the piezoelectric film 42, and the second electrode 43 are stacked in this order on the vibration plate 39.

One vibration portion 39a and one piezoelectric element 37 constitute one ultrasonic transducer 44. In the ultrasonic element 20, the ultrasonic transducers 44 are arranged in a two-dimensional array structure.

When the ultrasonic element 20 is the transmission unit 21, a pulse wave voltage of a predetermined frequency is applied between the first electrode 41 and the second electrode 43 of each ultrasonic transducer 44, whereby the piezoelectric film 42 expands and contracts. Due to the expansion and contraction of the piezoelectric film 42, the vibration portion 39a vibrates at a frequency corresponding to an opening width, etc. of the opening 38a. The ultrasonic wave 23 is transmitted from the vibration portion 39a in the positive Z direction along the first axis 26. A surface of the element board 36 on the positive Z direction side is a transmission surface 45 of the ultrasonic wave 23 of the transmission unit 21.

When the ultrasonic element 20 is the reception unit 22, the reception unit 22 has the same configuration as the transmission unit 21. The transmission surface 45 serves as a reception surface 46. The reception unit 22 receives the ultrasonic wave 23 input from the positive Z direction side toward the negative Z direction side. When the ultrasonic wave 23 is input from the openings 38a along the first axis 26, the vibration portions 39a vibrate in the reception unit 22. Accordingly, a potential difference is generated between a first electrode 41 side and a second electrode 43 side of the piezoelectric film 42, and a reception signal corresponding to the potential difference is output from the reception unit 22 to the control unit 11. The control unit 11 detects an intensity of the ultrasonic wave 23.

Figure 8:
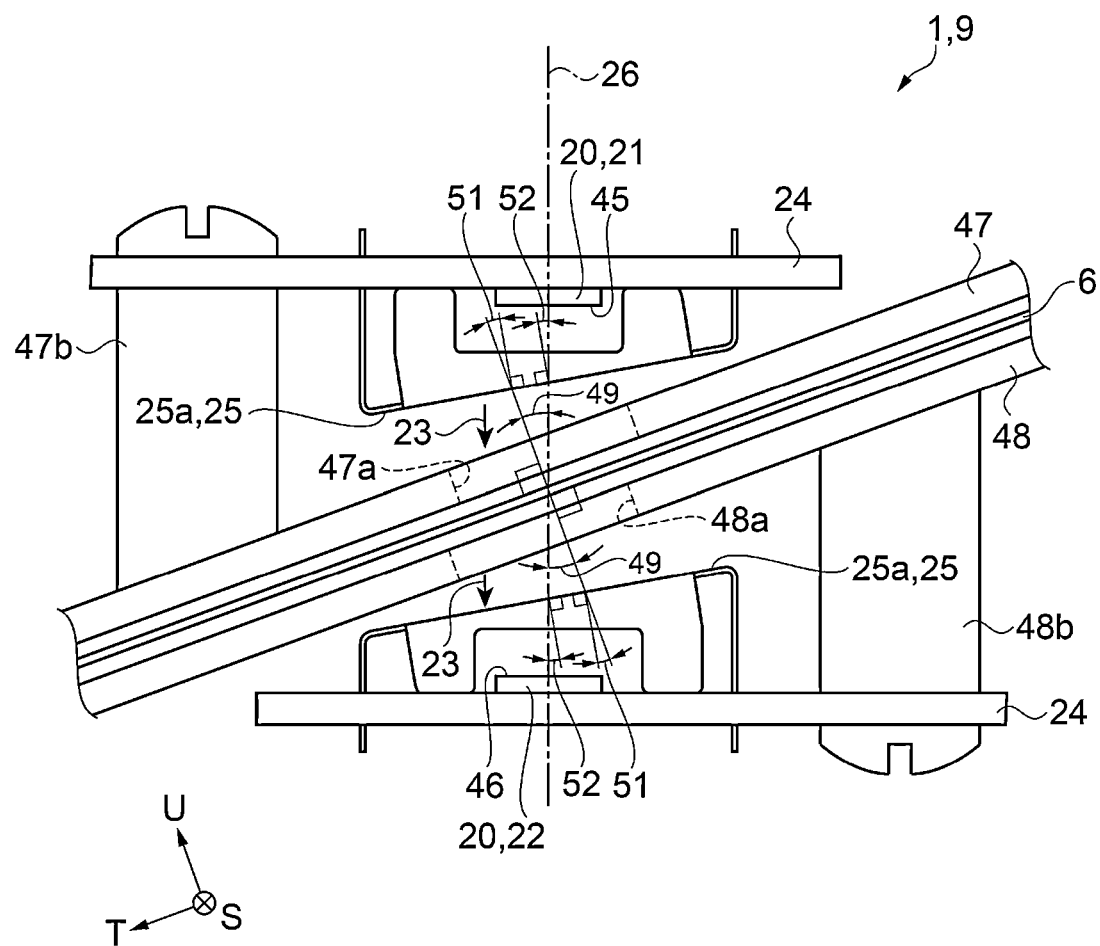
FIG. 8 is a schematic side view showing an arrangement of a transmission unit and a reception unit.

Next, an arrangement of the transmission unit 21 and the reception unit 22 will be described with reference to FIG. 8. The image scanner 1 includes a first guide plate 47 and a second guide plate 48. The sheet 6 passes between the first guide plate 47 and the second guide plate 48. The first guide plate 47 has a first passage hole 47a. The second guide plate 48 has a second passage hole 48a. Centers of the first passage hole 47a and the second passage hole 48a are disposed on the first axis 26. The ultrasonic wave 23 transmitted by the transmission unit 21 passes through the first passage hole 47a and the second passage hole 48a and reaches the reception unit 22.

The intensity of the ultrasonic wave 23 reaching the reception unit 22 is higher when there is no sheet 6 between the first passage hole 47a and the second passage hole 48a than that when the sheet 6 is present. By determining the intensity of the ultrasonic wave 23 received by the reception unit 22, it is possible to detect whether the sheet 6 is present between the first passage hole 47a and the second passage hole 48a.

The intensity of the ultrasonic wave 23 reaching the reception unit 22 is weaker when there are two sheets 6 between the first passage hole 47a and the second passage hole 48a than that when there is one sheet 6. By determining the intensity of the ultrasonic wave 23 received by the reception unit 22, it is possible to detect whether the number of sheets 6 is one or two between the first passage hole 47a and the second passage hole 48a.

The first guide plate 47 includes a first support portion 47b on a positive U direction side. The circuit board 24 of the transmission unit 21 is fixed to the first guide plate 47 by screws. The second guide plate 48 includes a second support portion 48b on a negative U direction side. The circuit board 24 of the reception unit 22 is fixed to the second guide plate 48 by screws.

The transmission unit 21 and the reception unit 22 are disposed at positions facing each other. The first axis 26 of the transmission unit 21 and the first axis 26 of the reception unit 22 are coaxial. The transmission unit 21 transmits the ultrasonic wave 23 toward the sheet 6. The reception unit 22 receives the ultrasonic wave 23 input from the sheet 6.

According to this configuration, the transmission unit 21 transmits the ultrasonic wave 23 to the sheet 6. The ultrasonic wave 23 transmitted from the transmission unit 21 is input to the sheet 6, and the ultrasonic wave 23 transmitted through the sheet 6 is received by the reception unit 22. Since the transmission unit 21 and the reception unit 22 are coaxial, the reception unit 22 can receive the ultrasonic wave 23 with high sensitivity.

The first axis 26 is inclined at a first angle 49 with respect to a normal line of a surface of the sheet 6. According to this configuration, multiple reflections occurring between the sheet 6 and the transmission unit 21 can be prevented. That is, the sheet 6 and the transmission surface 45 of the transmission unit 21 are not parallel to each other. Of the ultrasonic wave 23 transmitted by the transmission unit 21, the ultrasonic wave 23 reflected by the surface of the sheet 6 does not travel toward a direction of the transmission unit 21. Therefore, the multiple reflections can be prevented.

In the protective member 25 of the transmission unit 21, a normal line of the first surface 25a is inclined at a second angle 51 with respect to the normal line of the surface of the sheet 6. Also in the protective member 25 of the reception unit 22, the normal line of the first surface 25a is inclined at the second angle 51 with respect to the normal line of the surface of the sheet 6. A surface of the first surface 25a is not parallel to the sheet 6.

According to this configuration, the multiple reflections occurring between the sheet 6 and the first surface 25a of the protective member 25 can be prevented. The second angle 51 on a transmission unit 21 side and the second angle 51 on a reception unit 22 side may be the same as or different from each other.

In the protective member 25 of the transmission unit 21, the normal line of the first surface 25a is inclined at a third angle 52 with respect to the first axis 26. Also in the protective member 25 of the reception unit 22, the normal line of the first surface 25a is inclined at the third angle 52 with respect to the first axis 26. The first surface 25a and a surface of the ultrasonic element 20 are not parallel to each other.

According to this configuration, the multiple reflections occurring between the first surface 25a of the protective member 25 and the ultrasonic element 20 can be prevented. The third angle 52 on the transmission unit 21 side and the third angle 52 on the reception unit 22 side may be the same as or different from each other.

At least one of the first angle 49, the second angle 51, and the third angle 52 is preferably an angle of 5° or more. In the present embodiment, for example, the first angle 49 is 20°. The second angle 51 is 10°. The third angle 52 is 10°.

According to this configuration, when the first angle 49 is an angle of 5° or more, the multiple reflections occurring between the sheet 6 and the ultrasonic element 20 can be prevented. When the second angle 51 is an angle of 5° or more, the multiple reflections occurring between the sheet 6 and the first surface 25*a* of the protective member 25 can be prevented. When the third angle 52 is an angle of 5° or more, the multiple reflections occurring between the first surface 25*a* of the protective member 25 and the ultrasonic element 20 can be prevented.

In the ultrasonic device 9 provided with the transmission unit 21, when the multiple reflections of the ultrasonic wave 23 occur, a residual vibration affects the ultrasonic wave 23 to be transmitted next. In the ultrasonic device 9 provided with the reception unit 22, the ultrasonic device 9 converts a waveform of the ultrasonic wave 23 into reception signals. When the multiple reflections of the ultrasonic wave 23 occur, the residual vibration affects the reception signals. By preventing the multiple reflections as in the above embodiment, an influence of the residual vibration can be prevented.

Figure 9:
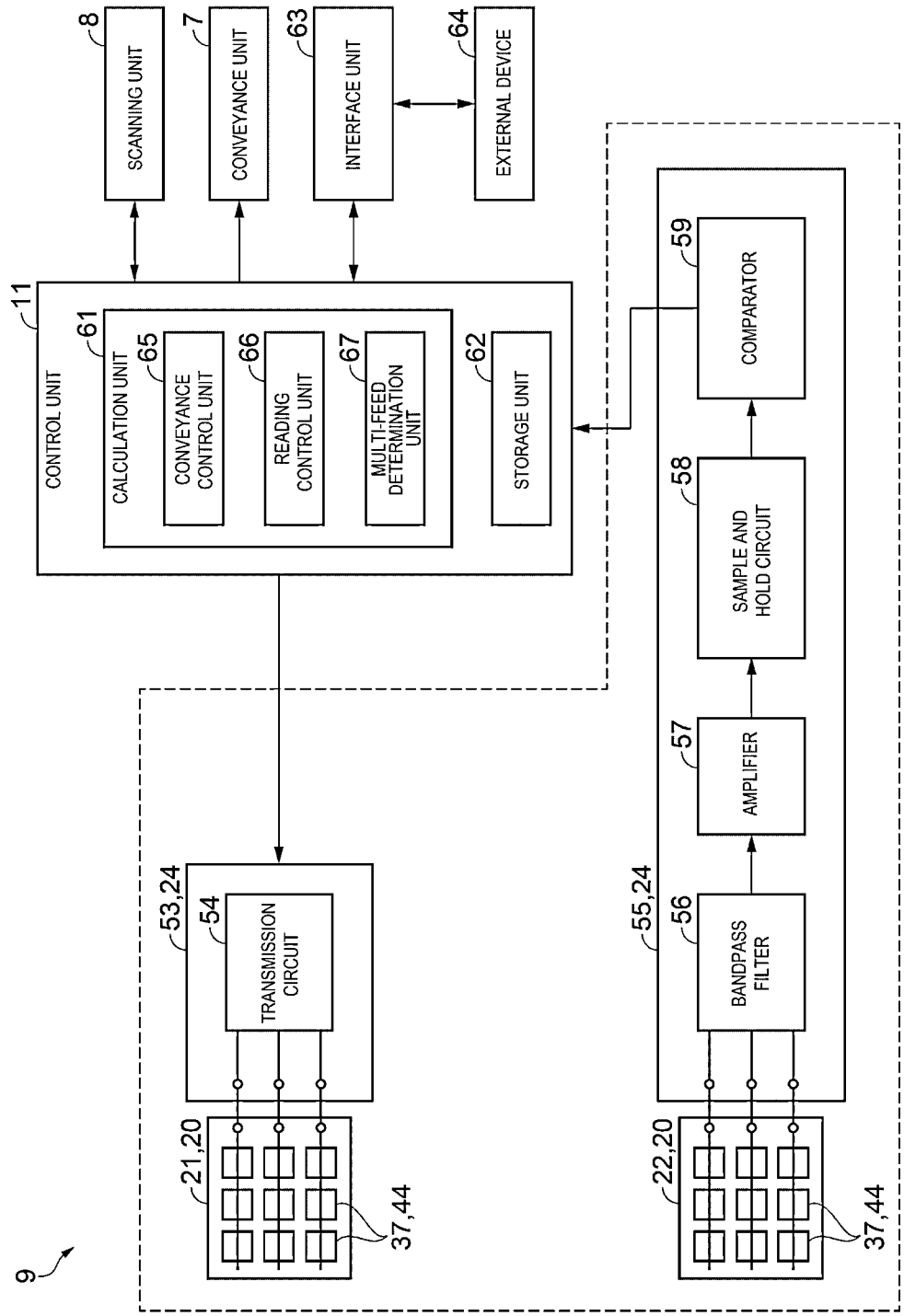
FIG. 9 is a control block diagram showing a control configuration of the image scanner.

As shown in FIG. 9, the circuit board 24 on which the transmission unit 21 is mounted is a transmission circuit board 53. The transmission circuit board 53 is provided with a transmission circuit 54. The transmission circuit 54 is electrically coupled to each ultrasonic transducer 44 of the transmission unit 21. The transmission circuit 54 generates a drive signal for driving each ultrasonic transducer 44.

The circuit board 24 on which the reception unit 22 is mounted is a reception circuit board 55. The reception circuit board 55 is provided with a reception circuit or the like for processing the reception signals and outputting the processed reception signal to the control unit 11. The reception circuit includes a bandpass filter 56, an amplifier 57, a sample and hold circuit 58, a comparator 59, and the like. The reception signals output from the reception unit 22 are input to the bandpass filter 56. Noise components and the like are removed from the reception signals by the bandpass filter 56. The reception signals are amplified by the amplifier 57 to have predetermined signal intensities or more. Next, the reception signals are input to the sample and hold circuit 58. The sample and hold circuit 58 samples the reception signals at a predetermined frequency. The sampled reception signals are input to the comparator 59. The comparator 59 detects a reception signal whose signal intensity exceeds a predetermined determination intensity among the sampled reception signals. The comparator 59 transmits the reception signal exceeding the determination intensity to the control unit 11.

The control unit 11 includes a calculation unit 61 implemented by a central processing unit (CPU) or the like, and a storage unit 62 implemented by a storage circuit such as a memory. The control unit 11 is electrically coupled to the conveyance motor 17 of the conveyance unit 7, the scanning unit 8, the transmission circuit 54 of the transmission circuit board 53, and the comparator 59 of the reception circuit board 55. The control unit 11 controls driving of the conveyance motor 17, the scanning unit 8, the transmission unit 21, and the reception unit 22. The control unit 11 is electrically coupled to an interface unit 63. The interface unit 63 receives various types of data and signals input from an external device 64 such as a personal computer. The interface unit 63 outputs read data read by the image scanner 1 to the external device 64.

Various types of data and various programs for controlling the image scanner 1 are stored in the storage unit 62. The calculation unit 61 reads the various programs stored in the storage unit 62. The calculation unit 61 executes various functions in accordance with the various programs. The calculation unit 61 functions as a conveyance control unit 65, a reading control unit 66, and a multi-feed determination unit 67 as a state detection unit.

The conveyance control unit 65 controls the conveyance motor 17 of the conveyance unit 7. The conveyance control unit 65 causes the conveyance motor 17 to rotate the first feed roller pair 13, the second feed roller pair 14, the first conveyance roller pair 15, and the second conveyance roller pair 16. The conveyance control unit 65 feeds the sheets 6 set on the sheet support 3 into the device main body 2 one by one. The conveyance control unit 65 conveys the fed sheet 6 along the conveying path 12. The reading control unit 66 controls the scanning unit 8 during the conveyance of the sheet 6. The reading control unit 66 causes the scanning unit 8 to read the image on the sheet 6.

The multi-feed determination unit 67 detects a multi-feed state of the sheets 6. The reception unit 22 receives the ultrasonic wave 23 from the sheet 6 and outputs the reception signal. The multi-feed determination unit 67 controls the ultrasonic device 9 to input the reception signal from the reception unit 22. The multi-feed determination unit 67 determines a state of the sheet 6 based on the reception signal. The state of the sheet 6 indicates whether the sheet 6 is in a multi-feed state. Specifically, when a voltage value of the reception signal is smaller than a determination value, the multi-feed determination unit 67 determines that the sheet 6 is multi-fed. When the multi-feed determination unit 67 determines that the sheet 6 is multi-fed, the conveyance control unit 65 stops the conveyance of the sheet 6. The multi-feed determination unit 67 is included in the ultrasonic device 9.

According to this configuration, when the ultrasonic wave 23 is received by the reception unit 22, the reception signal corresponding to the sound pressure of the ultrasonic wave 23 received by the reception unit 22 is output. A degree of transmission of the ultrasonic wave 23 in the sheet 6 can be detected based on a signal intensity of the reception signal. The multi-feed determination unit 67 detects the degree of transmission of the ultrasonic wave 23 in the sheet 6 based on the reception signal. The multi-feed determination unit 67 can detect a thickness and a type of the sheet 6 and whether the sheet 6 is in the multi-feed state based on the degree of transmission of the ultrasonic wave 23.

Figure 10:
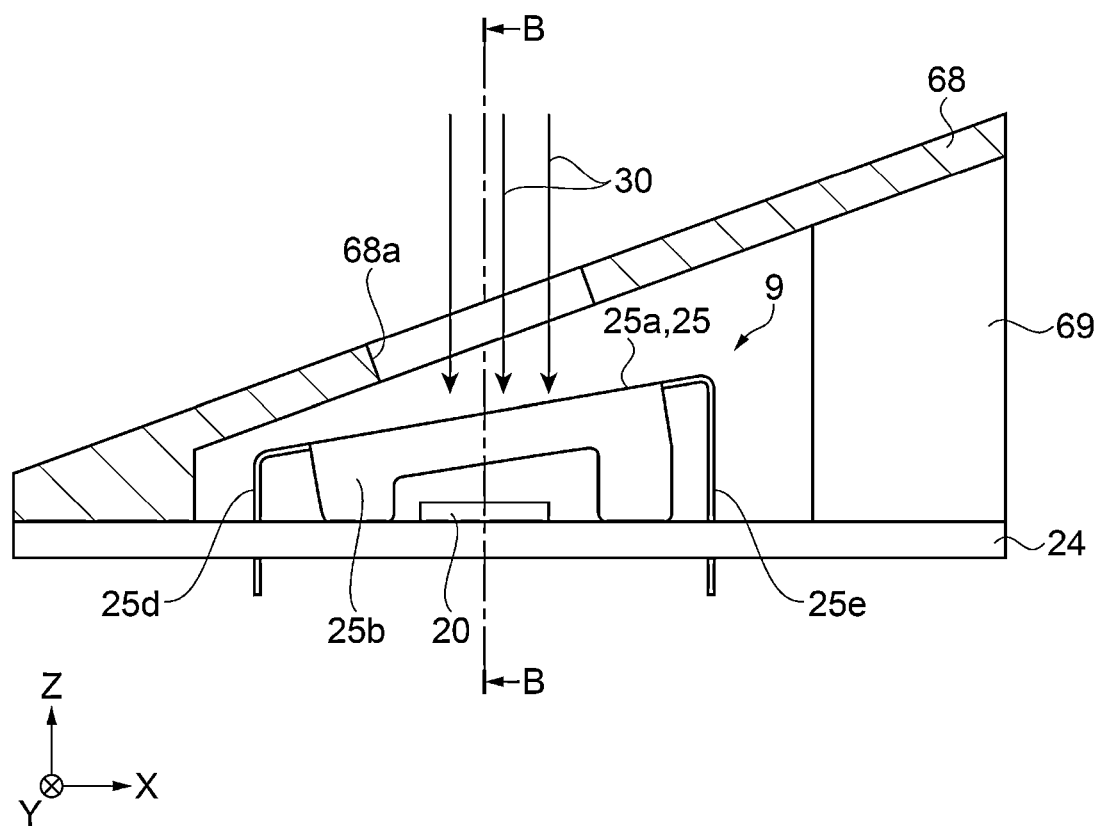
FIG. 10 is a schematic side sectional view showing a boundary condition of simulation.

Next, simulation in which air is discharged from the first opening 28 and the second opening 29 will be described. As shown in FIG. 10, in a simulation model, a guide plate 68 is disposed in the positive Z direction of the first surface 25*a*. The guide plate 68 corresponds to the first guide plate 47 and the second guide plate 48. The guide plate 68 has a passage hole 68*a* at a position overlapping with the ultrasonic element 20 when viewed from the positive Z direction. The air flow 30 passes through the passage hole 68*a* and reaches the first surface 25*a*.

The guide plate 68 is coupled to the circuit board 24 in the negative X direction. A support portion 69 is disposed in the positive X direction of the fifth surface 25*e*. The support portion 69 couples the circuit board 24 and the guide plate 68.

Figure 11:
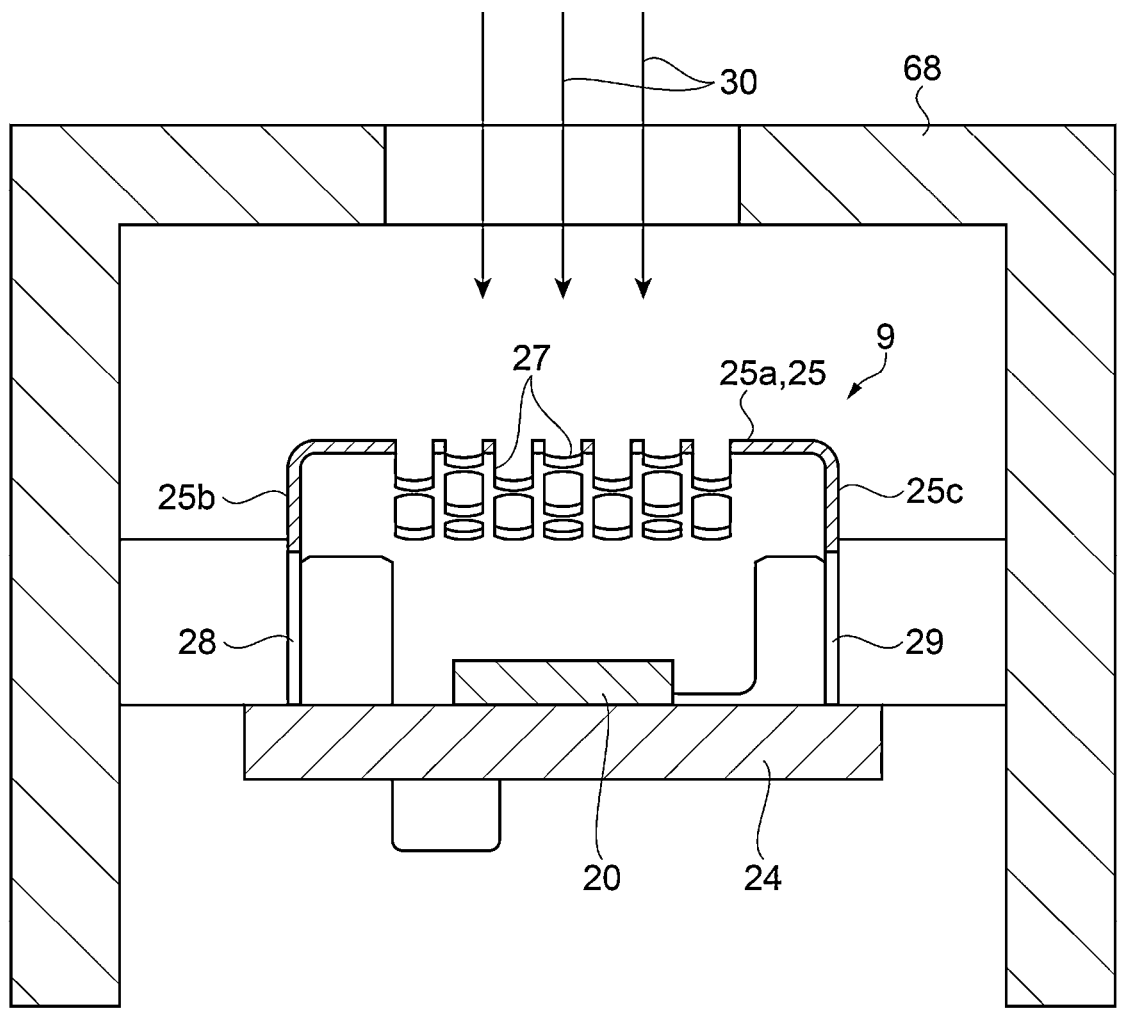
FIG. 11 is a schematic side sectional view showing a boundary condition of simulation.

FIG. 11 is a cross-sectional view taken along a line B-B of FIG. 10. As shown in FIG. 11, the guide plate 68 is also disposed in the negative Y direction of the second surface 25b and in the positive Y direction of the third surface 25c.

Figure 12:
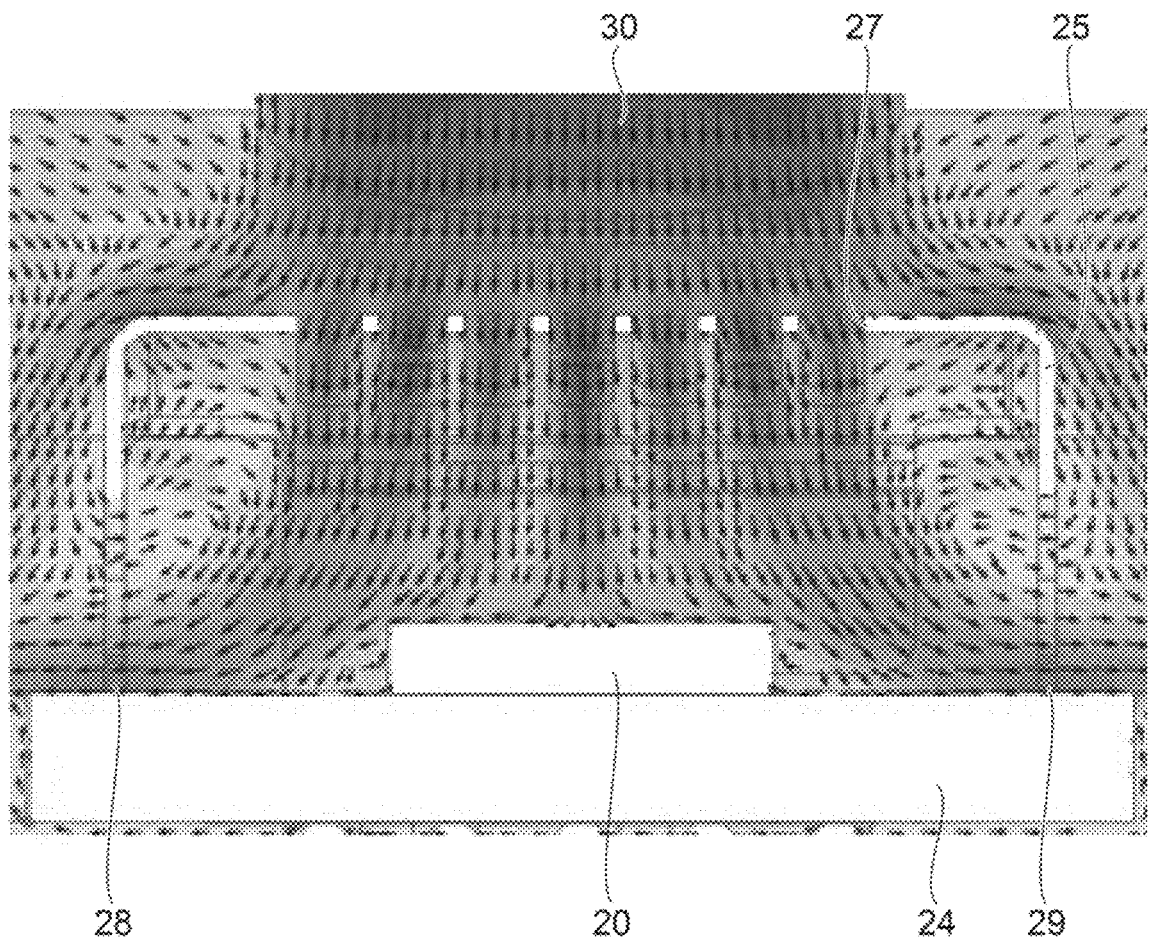
FIG. 12 is a diagram showing a simulation result.

In FIG. 12, the air flow 30 is fast in a dark place. In a bright place, the air flow 30 is slow. Arrows indicate directions in which the air flow 30 flows. The air flow 30 passes through the hole 27 and enters the protective member 25. The air flow 30 reaches the ultrasonic element 20 or the circuit board 24. A travelling direction of the air flow 30 reaching the ultrasonic element 20 or the circuit board 24 is changed to the positive Y direction or the negative Y direction. The air flow 30 moving in the negative Y direction travels to the outside of the protective member 25 through the first opening 28. The air flow 30 moving in the positive Y direction travels to the outside of the protective member 25 through the second opening 29.

Therefore, the air flow 30 smoothly flows inside the protective member 25. Over the ultrasonic element 20, a flow rate of the air flow 30 is large and a flow velocity is also large. Therefore, it is less likely for the fine foreign matter to adhere to the ultrasonic element 20. Even when the fine foreign matter adheres to the ultrasonic element 20, the fine foreign matter is moved to the outside of the protective member 25 by the air flow 30. As a result, the sensitivity of the ultrasonic element 20 can be prevented from being lowered by the fine foreign matter.

Figure 20:
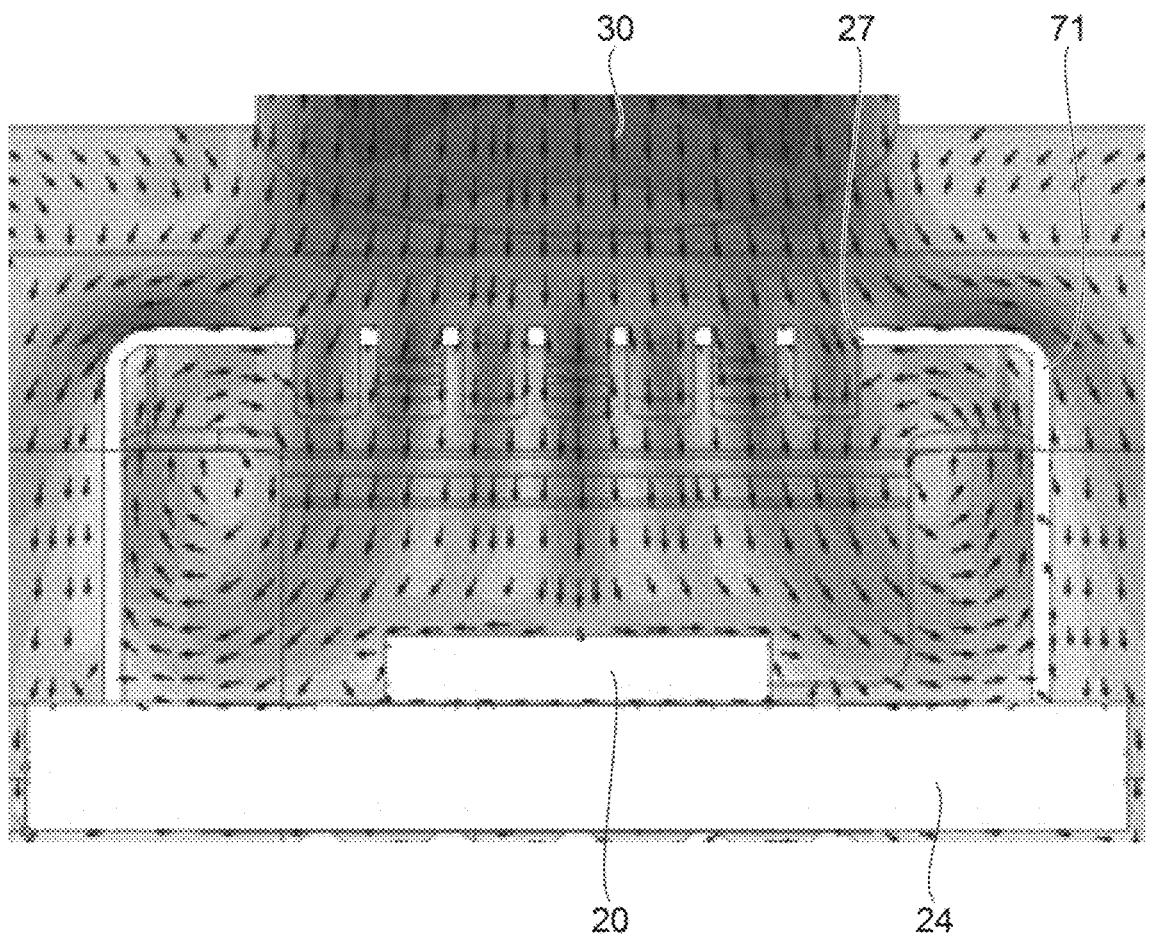
FIG. 20 is a diagram showing a simulation result in a comparative example.

FIG. 20 shows a comparative example. A protective member 71 according to the comparative example does not include the first opening 28 or the second opening 29. The air flow 30 passes through the hole 27 and enters the protective member 71. Inside the protective member 71, the air flow 30 circulates. At this time, since an air pressure is high inside the protective member 71, it is less likely for the air flow 30 to enter the protective member 71.

Therefore, the air flow 30 is likely to stagnate inside the protective member 71. Since the flow rate of the air flow 30 is small and the flow velocity is small over the ultrasonic element 20, the fine foreign matter easily adheres to the ultrasonic element 20. When the fine foreign matter adheres to the ultrasonic element 20, the foreign matter remains adhering to the ultrasonic element 20. As a result, the sensitivity of the ultrasonic element 20 may be lowered due to the fine foreign matter.

Second Embodiment

The present embodiment is different from the first embodiment in that the second opening 29 is not provided in a protective member. In the following description, described items are denoted by the same reference numerals, and the description thereof is omitted or simplified.

Figure 13:
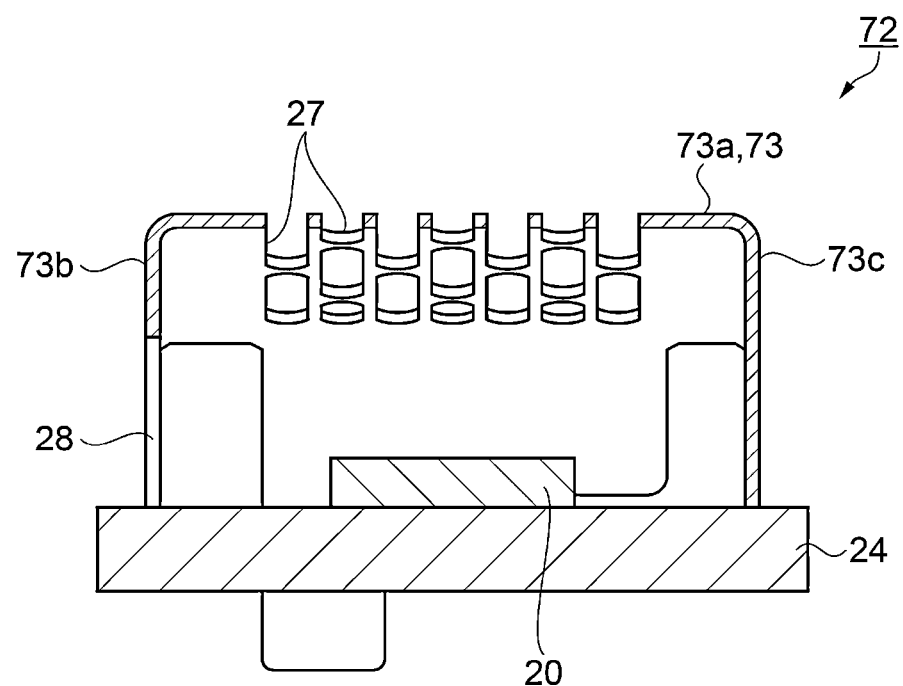
FIG. 13 is a schematic side sectional view showing a configuration of an ultrasonic device according to a second embodiment.

As shown in FIG. 13, an ultrasonic device 72 includes a protective member 73. The protective member 73 has the holes 27 in a first surface 73a. The protective member 73 has the first opening 28 in a second surface 73b. The protective member 73 does not have an opening in a third surface 73c. The first surface 73a, the second surface 73b, and the third surface 73c correspond to the first surface 25a, the second surface 25b, and the third surface 25c according to the first embodiment, respectively.

Contents indicated by light and dark and arrows in FIG. 14 are the same as those in FIG. 12. As shown in FIG. 14, the air flow 30 passes through the holes 27 and enters the protective member 73. The air flow 30 reaches the ultrasonic element 20 or the circuit board 24. The travelling direction of the air flow 30 reaching the ultrasonic element 20 or the circuit board 24 is changed to the positive Y direction or the negative Y direction. The air flow 30 moving in the negative Y direction travels to an outside of the protective member 73 through the first opening 28. The air flow 30 moving in the positive Y direction circulates inside the protective member 73.

Therefore, the air flow 30 smoothly flows inside the protective member 73 in the negative Y direction. Over the ultrasonic element 20 in the negative Y direction, the flow rate of the air flow 30 is large and the flow velocity is also large. It is less likely for the fine foreign matter to adhere to the ultrasonic element 20. Even when the fine foreign matter adheres to the ultrasonic element 20, the fine foreign matter is moved to the outside of the protective member 73 by the air flow 30. As a result, sensitivity of the ultrasonic element 20 in the negative Y direction can be prevented from being lowered by the fine foreign matter.

The protective member 73 has the second surface 73b that intersects with the first surface 73a and is provided with the first opening 28 through which the foreign matter enters from the plurality of holes 27. According to this configuration, the ultrasonic element 20 can be protected by the protective member 73. The foreign matter may enter through the plurality of holes 27 provided in the protective member 73. By allowing air to pass through the plurality of holes 27, the foreign matter can be discharged from the first opening 28 of the second surface 73b. As a result, the sensitivity of the ultrasonic element 20 can be prevented from being lowered by the foreign matter.

Third Embodiment

The present embodiment is different from the first embodiment in that a sound absorbing unit is provided on the first surface 25a of the protective member 25. In the following description, described items are denoted by the same reference numerals, and the description thereof is omitted or simplified.

Figure 15:
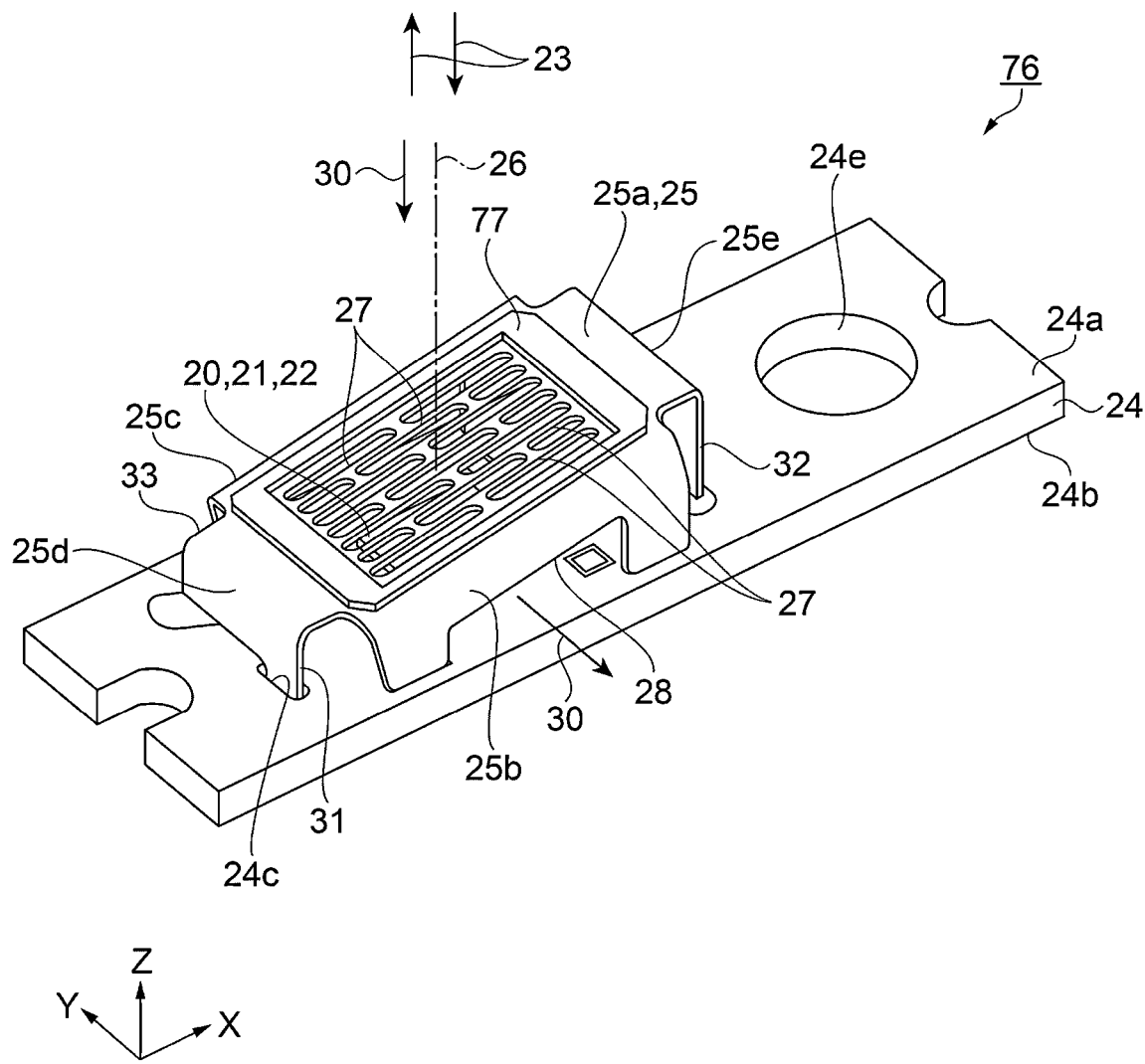
FIG. 15 is a schematic perspective view of an ultrasonic device according to a third embodiment.

As shown in FIG. 15, a sound absorbing unit 77 surrounding the plurality of holes 27 is provided on the first surface 25a of the protective member 25 of an ultrasonic device 76. The sound absorbing unit 77 has a frame shape when viewed from the positive Z direction. The sound absorbing unit 77 is formed by providing a porous member such as urethane. Surfaces of the first guide plate 47 and the second guide plate 48 facing the first surface 25a may be subjected to surface roughening processing or the like to scatter the ultrasonic wave 23.

According to this configuration, the sound absorbing unit 77 is provided on the first surface 25a. The sound absorbing unit 77 does not reflect the ultrasonic wave 23. Therefore, the multiple reflections of the ultrasonic wave 23 between the first surface 25a and the sheet 6 can be prevented. When a multiple reflection component is received by the ultrasonic element 20, the reception signal is large, and thus there is a possibility that the sheet 6 cannot be appropriately detected. In the present embodiment, the multiple reflection component can be prevented, and multi-feed of the sheets 6 can be appropriately determined.

Fourth Embodiment

In the present embodiment, a shape of the hole 27 is different from that of the first embodiment. In the following description, described items are denoted by the same reference numerals, and the description thereof is omitted or simplified.

Figure 16:
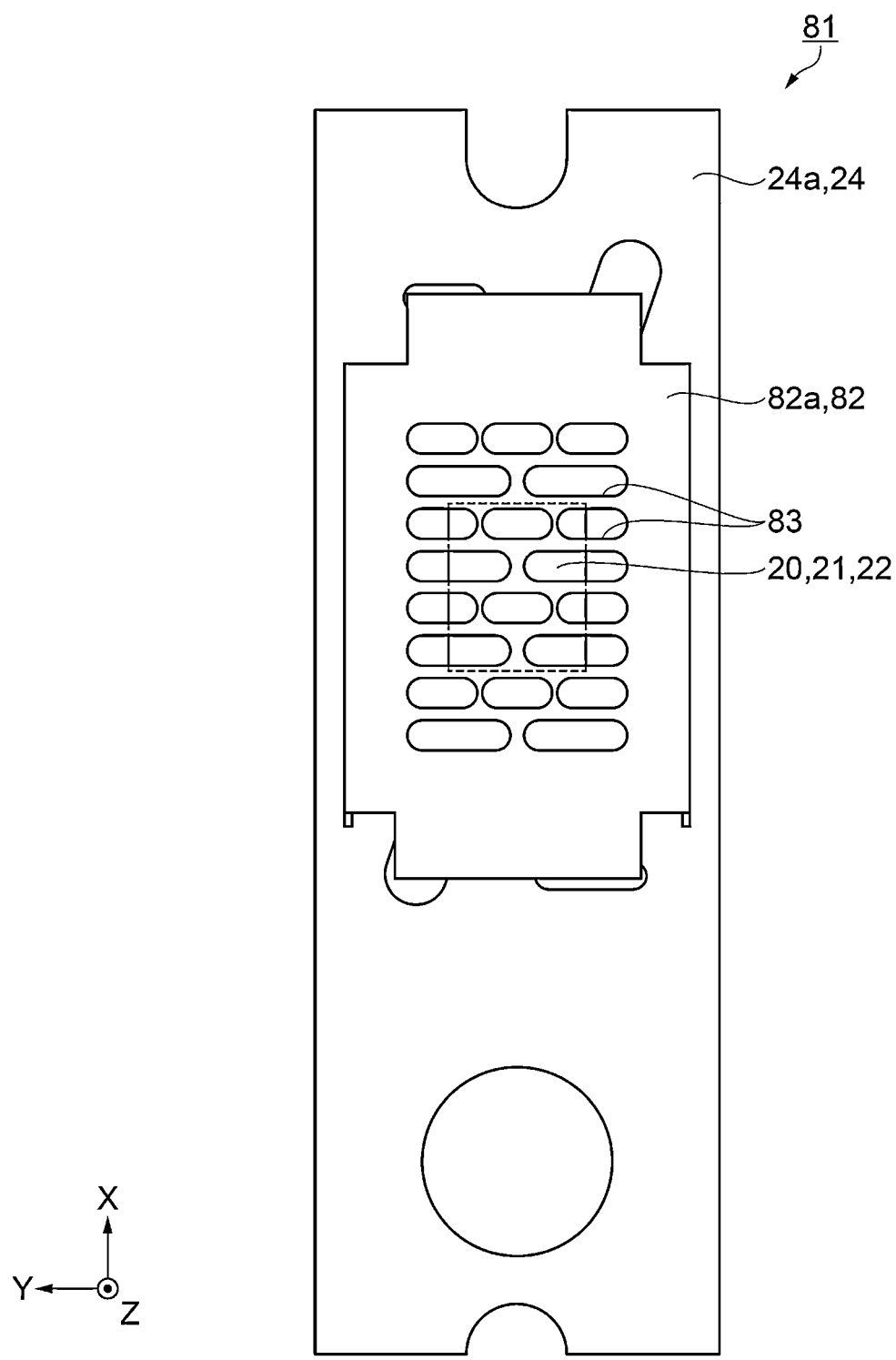
FIG. 16 is a schematic plan view of an ultrasonic device according to a fourth embodiment.

As shown in FIG. 16, an ultrasonic device 81 includes a protective member 82. The protective member 82 has a plurality of holes 83 in a first surface 82a. A longitudinal direction of the holes 83 is parallel to the short direction of the circuit board 24. The ultrasonic wave 23 and the air flow 30 pass through the holes 83.

Figure 17:
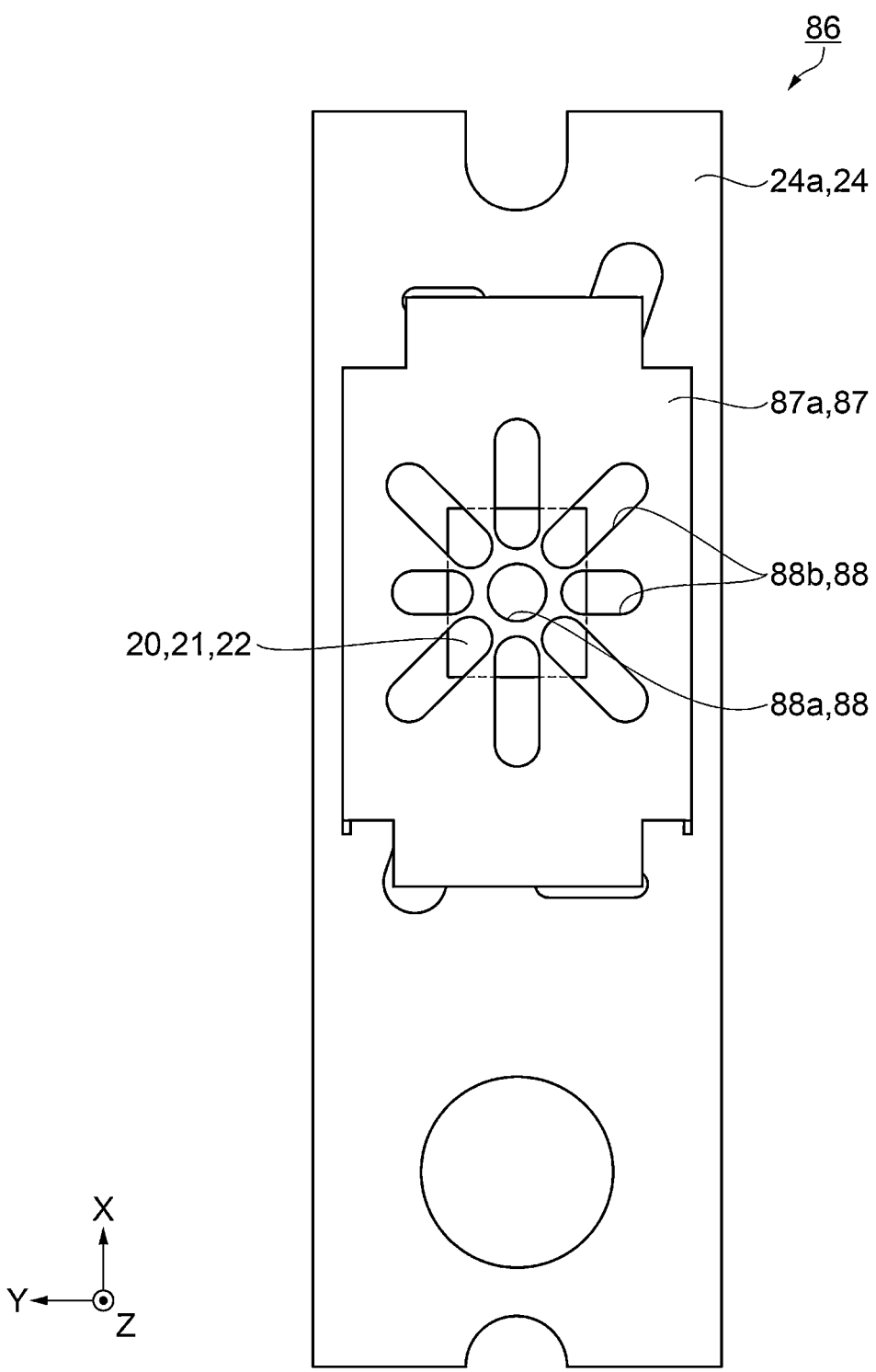
FIG. 17 is a schematic plan view of an ultrasonic device.

As shown in FIG. 17, an ultrasonic device 86 includes a protective member 87. The protective member 87 has a plurality of holes 88 in a first surface 87a. The holes 88 have a circular first hole 88a and elongated second holes 88b. When viewed from the positive Z direction, the first hole 88a is disposed at a center of the ultrasonic element 20. The second holes 88b are radially disposed around the first hole 88a. The ultrasonic wave 23 and the air flow 30 pass through the holes 88.

Figure 18:
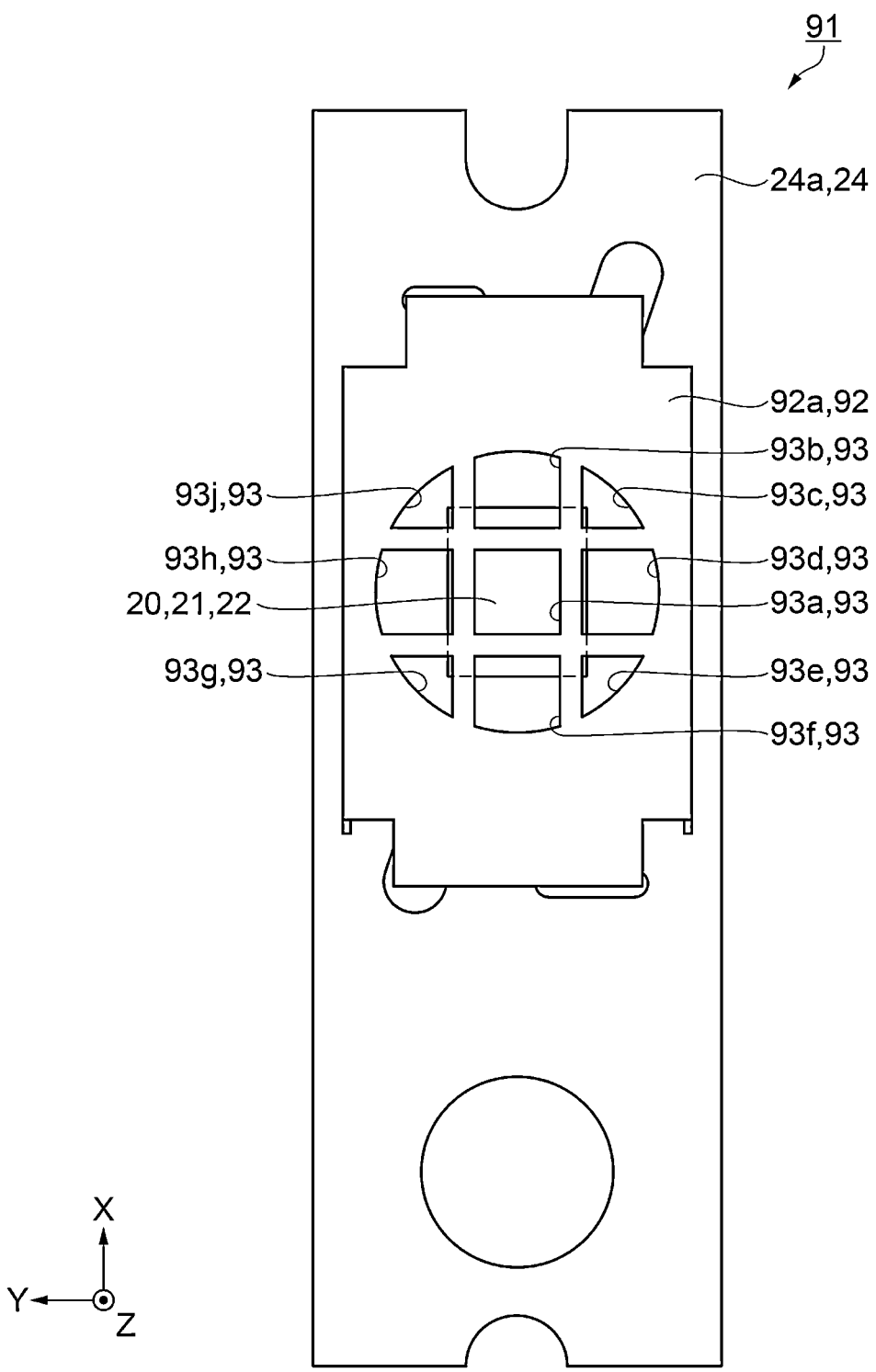
FIG. 18 is a schematic plan view of an ultrasonic device.

As shown in FIG. 18, an ultrasonic device 91 includes a protective member 92. The protective member 92 has a plurality of holes 93 in a first surface 92a. The holes 93 have a first to ninth holes 93a to 93j. The first to ninth holes 93a to 93j are arranged in a matrix. When viewed from the positive Z direction, the first hole 93a is disposed at the center of the ultrasonic element 20. The first hole 93a has a square shape.

The second hole 93b is disposed in the positive X direction of the first hole 93a. The second hole 93b has a substantially quadrangular shape, and a side on the positive X direction side has an arc shape. The third hole 93c is disposed in the positive X direction and the negative Y direction of the first hole 93a. The third hole 93c has a substantially triangular shape, and a side on the positive X direction side and the negative Y direction side has an arc shape.

The fourth hole 93d is disposed in the negative Y direction of the first hole 93a. The fourth hole 93d has a substantially quadrangular shape, and a side on the negative Y direction side has an arc shape. The fifth hole 93e is disposed in the negative X direction and the negative Y direction of the first hole 93a. The fifth hole 93e has a substantially triangular shape, and a side on the negative X direction side and the negative Y direction side has an arc shape.

The sixth hole 93f is disposed in the negative X direction of the first hole 93a. The sixth hole 93f has a substantially quadrangular shape, and a side on the negative X direction side has an arc shape. The seventh hole 93g is disposed in the negative X direction and the positive Y direction of the first hole 93a. The seventh hole 93g has a substantially triangular shape, and a side on the negative X direction side and the positive Y direction side has an arc shape.

The eighth hole 93h is disposed in the positive Y direction of the first hole 93a. The eighth hole 93h has a substantially quadrangular shape, and a side on the positive Y direction side has an arc shape. The ninth hole 93j is disposed in the positive X direction and the positive Y direction of the first hole 93a. The ninth hole 93j has a substantially triangular shape, and a side on the positive X direction side and the positive Y direction side has an arc shape. The ultrasonic wave 23 and the air flow 30 pass through the holes 93.

An arrangement and shapes of the holes are not particularly limited as in the holes 83, the holes 88, and the holes 93 corresponding to the plurality of holes 27 of the first embodiment. It is preferable to dispose the holes 93 having sizes by which the ultrasonic wave 23 and the air flow 30 flow. The hole may be a single hole. The hole may be a hole obtained by coupling the first to ninth holes 93a to 93j. The shape of the hole is not particularly limited. The shape of the hole may be circular or quadrangular.

Fifth Embodiment

In the present embodiment, shapes of the first opening 28 and the second opening 29 are different from those of the first embodiment. In the following description, described items are denoted by the same reference numerals, and the description thereof is omitted or simplified.

Figure 19:
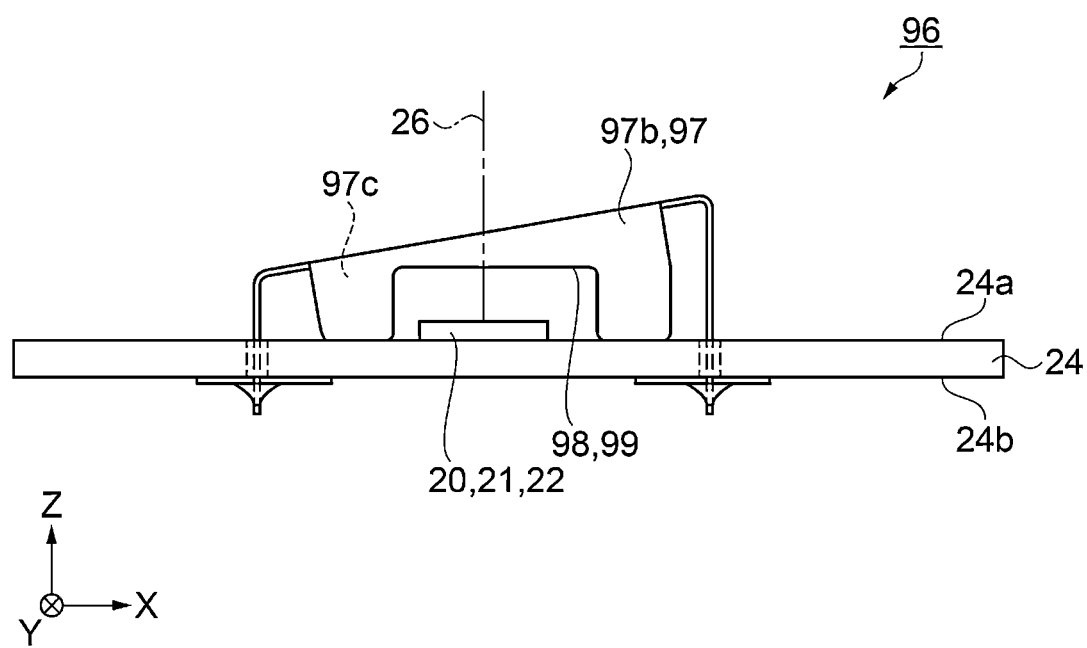
FIG. 19 is a schematic side view of an ultrasonic device according to a fifth embodiment.

As shown in FIG. 19, an ultrasonic device 96 includes a protective member 97. The protective member 97 has a first opening 98 in a second surface 97b. The protective member 97 has a second opening 99 in a third surface 97c. The second surface 97b and the third surface 97c correspond to the second surface 25b and the third surface 25c according to the first embodiment, respectively.

The first opening 98 and the second opening 99 are substantially rectangular. As described above, the second surface 25b and the third surface 25c according to the first embodiment may have any shape as long as the air flow 30 easily flows, and the shapes of the first opening 98 and the second opening 99 are not particularly limited.

Sixth Embodiment

In the first embodiment, the transmission unit 21 is the ultrasonic element 20 that transmits the ultrasonic wave 23. The reception unit 22 is the ultrasonic element 20 that receives the ultrasonic wave 23. A single transmission and reception unit that performs transmission and reception processing on the ultrasonic wave 23 may be provided. A part of the transmission and reception unit may transmit the ultrasonic wave 23, and the other part thereof may receive the ultrasonic wave 23.

Seventh Embodiment

In the first embodiment, the ultrasonic device 9 detects multi-feed of the sheet 6. The ultrasonic device 9 may be used for purposes other than the detection of the sheet 6. For example, the ultrasonic device 9 according to the first embodiment may be used as a data transmission device that transmits data by the ultrasonic wave 23. The ultrasonic device 9 according to the first embodiment may be used as an insect-repelling device or an animal repelling device that repels insects or animals using the ultrasonic wave 23. The ultrasonic device 9 according to the first embodiment may be used in an ultrasonic device such as a tactile sense transmission device using the ultrasonic wave 23. In this device, only the transmission unit 21 may be provided. The ultrasonic device 9 according to the first embodiment may be used as a data receiving device that receives an ultrasonic signal transmitted from a data transmitting device using the ultrasonic wave 23. In this device, only the reception unit 22 may be provided.

The ultrasonic device 9 may be used as a distance measurement sensor that measures a distance from the ultrasonic element 20 to a measurement target. The distance measurement sensor measures the distance from the ultrasonic element 20 to the measurement target based on time from a timing at which the transmission unit 21 transmits the ultrasonic wave 23 to the measurement target to a timing at which the reception unit 22 receives the ultrasonic wave 23 reflected by the measurement target.

The same effect as described above can be obtained even when the ultrasonic device 9 is used for applications other than the multi-feed detection of the sheet 6. In the ultrasonic device 9 provided with the transmission unit 21, transmission sensitivity is lowered when the foreign matter adheres to the surface of the transmission unit 21. In the ultrasonic device 9 provided with the reception unit 22, reception sensitivity is lowered when the foreign matter adheres to the surface of the reception unit 22. The air flow 30 enters from the plurality of holes 27 and passes through the first opening 28 and the second opening 29, whereby the foreign matter can be discharged from the first opening 28 and the second opening 29. As a result, the sensitivity of the ultrasonic element 20 can be prevented from being lowered by the foreign matter.

What is claimed is:

1. An ultrasonic device, comprising:
    an ultrasonic element configured to perform at least one of transmission of an ultrasonic wave along a first axis or reception of the ultrasonic wave along the first axis; and
    a protective member provided on the first axis to cover the ultrasonic element, wherein
        the protective member has:
            a first surface provided with at least one hole through which the ultrasonic wave travelling along the first axis passes, and
            a second surface intersecting with the first surface,
        the second surface is provided with a first opening through which foreign matter entering from the at least one hole is discharged,
        the protective member further has a third surface intersecting with the first surface,
        the third surface faces the second surface,
        the ultrasonic element is between the third surface and the second surface, and
        the third surface is provided with a second opening through which the foreign matter entering from the at least one hole is discharged.

2. The ultrasonic device according to claim 1, wherein a sound absorbing unit surrounding the at least one hole is provided at the first surface.

3. The ultrasonic device according to claim 2, wherein
    the ultrasonic element is further configured to perform at least one of the transmission of the ultrasonic wave toward an object or the reception of the ultrasonic wave input from the object, and
    the first axis is inclined at a first angle with respect to a normal line of a surface of the object.

4. The ultrasonic device according to claim 3, wherein a normal line of the first surface is inclined at a second angle with respect to the normal line of the surface of the object.

5. The ultrasonic device according to claim 4, wherein the normal line of the first surface is inclined at a third angle with respect to the first axis.

6. The ultrasonic device according to claim 2, wherein
    a pair of ultrasonic elements are provided, one of the pair of ultrasonic elements is a transmission unit configured to transmit the ultrasonic wave, and other one of the pair of ultrasonic elements is a reception unit configured to receive the ultrasonic wave, and
    the transmission unit and the reception unit are provided at positions facing each other on the first axis.

7. The ultrasonic device according to claim 6, wherein
    the reception unit is further configured to receive the ultrasonic wave from an object and output a reception signal, and
    the ultrasonic device further includes a state detection unit configured to detect a state of the object based on the reception signal.

8. The ultrasonic device according to claim 1, wherein
    the ultrasonic element is further configured to perform at least one of the transmission of the ultrasonic wave toward an object or the reception of the ultrasonic wave input from the object, and
    the first axis is inclined at a first angle with respect to a normal line of a surface of the object.

9. The ultrasonic device according to claim 8, wherein a normal line of the first surface is inclined at a second angle with respect to the normal line of the surface of the object.

10. The ultrasonic device according to claim 9, wherein the normal line of the first surface is inclined at a third angle with respect to the first axis.

11. The ultrasonic device according to claim 10, wherein at least one of the first angle, the second angle, or the third angle is 5° or more.

12. The ultrasonic device according to claim 1, wherein
    a pair of ultrasonic elements are provided, one of the pair of ultrasonic elements is a transmission unit configured to transmit the ultrasonic wave, and other one of the pair of ultrasonic elements is a reception unit configured to receive the ultrasonic wave, and
    the transmission unit and the reception unit are provided at positions facing each other on the first axis.

13. The ultrasonic device according to claim 12, wherein
    the reception unit is further configured to receive the ultrasonic wave from an object and output a reception signal, and
    the ultrasonic device further includes a state detection unit configured to detect a state of the object based on the reception signal.

* * * * *